(12) United States Patent
Erickson et al.

(10) Patent No.: US 12,044,700 B2
(45) Date of Patent: Jul. 23, 2024

(54) AIRSPEED SENSOR, SYSTEM AND AIRSPEED MONITORING PROCESS DIGITALLY IMPLEMENTED THEREBY OR IN RELATION THERETO

(71) Applicant: MOTUS DESIGN GROUP LTD., Victoria (CA)

(72) Inventors: Joshua Gregg Erickson, Victoria (CA); Jeffrey Owen Doyle, Victoria (CA)

(73) Assignee: Motus Design Group Ltd., Victoria (CA)

( * ) Notice: Subject to any disclaimer, the term of this patent is extended or adjusted under 35 U.S.C. 154(b) by 312 days.

(21) Appl. No.: 17/434,626

(22) PCT Filed: Mar. 10, 2020

(86) PCT No.: PCT/CA2020/050316
§ 371 (c)(1),
(2) Date: Aug. 27, 2021

(87) PCT Pub. No.: WO2020/181371
PCT Pub. Date: Sep. 17, 2020

(65) Prior Publication Data
US 2022/0163555 A1 May 26, 2022

(30) Foreign Application Priority Data
Mar. 12, 2019 (CA) .................. CA 3036447

(51) Int. Cl.
*G01P 5/14* (2006.01)
*A42B 3/04* (2006.01)
(Continued)

(52) U.S. Cl.
CPC .............. *G01P 5/14* (2013.01); *A42B 3/0433* (2013.01); *B62J 45/41* (2020.02); *B62J 45/422* (2020.02)

(58) Field of Classification Search
None
See application file for complete search history.

(56) References Cited

U.S. PATENT DOCUMENTS 4,836,019 A * 6/1989 Hagen .................. G01P 13/025
73/182
4,987,542 A 1/1991 Tran
(Continued)

FOREIGN PATENT DOCUMENTS

CA 2160093 C 7/2007
EP 0529258 A1 3/1993
(Continued)

OTHER PUBLICATIONS

International Search Report corresponding to International Patent Application No. PCT/CA2020/050316 dated Jun. 10, 2020.
(Continued)

*Primary Examiner* — Andre J Allen
(74) *Attorney, Agent, or Firm* — KDW Firm PLLC

(57) ABSTRACT

The present disclosure relates to an air-speed sensor, system and monitoring process This sensor generally comprise a sensor casing having a leading surface and distinctly oriented input ports. Each input port can independently capture respective air pressure and connects to a pressure sensor that independently measures that air pressure digital processor connects to each pressure sensor and can digitally compute pressure ratios between the input ports and compare these ratios against designated pressure ratios corresponding to designated incident airspeed angles of incidence to output an airspeed incident angle and airspeed accordingly.

23 Claims, 18 Drawing Sheets

(51) Int. Cl.
*B62J 45/41* (2020.01)
*B62J 45/422* (2020.01)

(56) References Cited

U.S. PATENT DOCUMENTS

| | | | | |
|---|---|---|---|---|
| 5,796,612 | A * | 8/1998 | Palmer | B64D 43/02 |
| | | | | 701/4 |
| D545,227 | S | 6/2007 | Benning et al. | |
| D548,634 | S | 8/2007 | Benning et al. | |
| 7,490,510 | B2 * | 2/2009 | Agami | G01P 5/14 |
| | | | | 73/182 |
| 2017/0336631 | A1 | 11/2017 | Armstrong | |
| 2018/0303190 | A1 | 10/2018 | Calilung et al. | |
| 2019/0291879 | A1 | 9/2019 | Baker et al. | |
| 2020/0348331 | A1 * | 11/2020 | Morton | G01P 5/165 |
| 2022/0114906 | A1 * | 4/2022 | Landers | G09B 9/003 |

FOREIGN PATENT DOCUMENTS

| | | | |
|---|---|---|---|
| EP | 1314042 | B1 | 8/2007 |
| EP | 1314985 | B1 | 9/2010 |
| WO | WO 2014113874 | A1 | 7/2014 |
| WO | WO 2017197524 | A1 | 11/2017 |

OTHER PUBLICATIONS

Written Opinion corresponding to International Patent Application No. PCT/CA2020/050316 dated Jun. 10, 2020.
Supplementary European Search Report corresponding to EP Application No. 20 77 0496 dated Oct. 27, 2022.

* cited by examiner

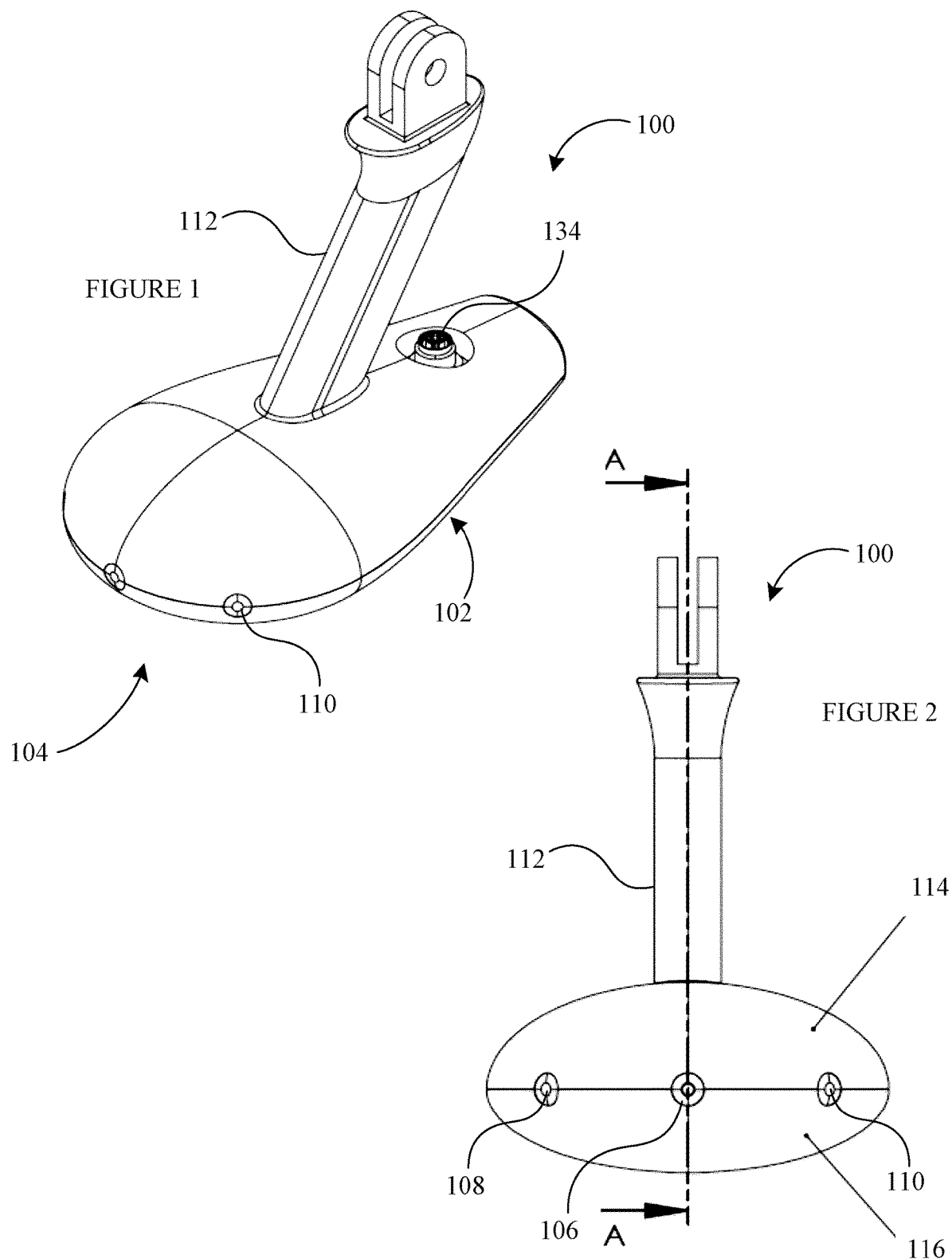

though pitot tubes work particularly well for high speed

AIRSPEED SENSOR, SYSTEM AND AIRSPEED MONITORING PROCESS DIGITALLY IMPLEMENTED THEREBY OR IN RELATION THERETO

CROSS REFERENCE TO RELATED APPLICATIONS

This application is a U.S. National Stage of International Application No. PCT/CA2020/050316 filed Mar. 10, 2020, which claims priority to Canadian Patent Application No. 3,036,447 filed Mar. 12, 2019, the entire disclosure of each of which is incorporated herein by reference.

FIELD OF THE DISCLOSURE

The present disclosure relates to sensors, and, in particular, to an airspeed sensor, system and airspeed monitoring process digitally implemented thereby or in relation thereto.

BACKGROUND

Airflow sensors are common in various applications to determine the absolute or relative airflow at a particular location, for example, to output an airflow speed. This is particularly common for aircrafts where a relative headwind speed can be used to determine an aircraft speed. This also applies to race cars where a relative airflow velocity can provide useful information (e.g. in respect of fuel consumption, drafting, etc.). Most commonly, a pitot tube is installed in line with a direction of travel of the vehicle so to compute a differential pressure that can be translated into a headwind speed.

While pitot tubes work particularly well for high speed applications where headwind values greatly outweigh any lateral wind components, they are not particularly amenable to applications where a lateral wind component is of interest or of greater relative significance, for example, in lower speed applications where travel speed, for example, is of a similar order of magnitude, if not less, than a local wind speed.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims A need exists for an airspeed sensor, system and airspeed monitoring process digitally implemented thereby, that overcome some of the drawbacks of known techniques, or at least, provides a useful alternative thereto. Some aspects of this disclosure provide examples of such processes, systems and methods.

In accordance with one aspect, there is provided an airspeed sensor comprising: a sensor casing having a leading surface and having plural distinctly oriented input ports defined therein to capture a respective air pressure at each one thereof; respective pressure sensors disposed within said casing in fluid communication with respective ones of said input ports to sense said respective air pressure for each one thereof; a digital processor operatively coupled to each of said pressure sensors to digitally compute respective pressure ratios between said input ports and compare said ratios against designated pressure ratios corresponding to designated incident airspeed angles of incidence to output an airspeed incident angle and airspeed accordingly.

In one embodiment, the pressure sensor comprises differential pressure sensors operable to sense respective relative air pressures for each of said input ports with reference to a common reference pressure.

In one embodiment, the sensor further comprises a static pressure port from which to measure said common reference pressure.

In one embodiment, the common reference pressure comprises an internal casing pressure.

In one embodiment, the internal casing pressure is iteratively computed by said digital processor to coincide with computation of a substantially identical airspeed incident angle from each of said ratios.

In one embodiment, the plural distinctly oriented input ports comprise at least three distinctly oriented input ports.

In one embodiment, the at least three input ports are substantially linearly distributed along said leading surface to form respective angles of incidence around a common axis such that said airspeed incident angle is computed around said axis.

In one embodiment, the airspeed sensor is disposable so to align said leading surface with a direction of travel such that said input ports and said axis are substantially perpendicular to said direction of travel.

In one embodiment, the input ports comprise a central input port and two opposed side-angled input ports.

In one embodiment, the airspeed sensor further comprises a communication interface to externally communicate said airspeed incident angle and said airspeed to an external device.

In accordance with another aspect, there is provided an airspeed sensing system comprising: an airspeed sensor comprising plural distinctly oriented input ports to capture a respective air pressure at each one thereof; respective pressure sensors in fluid communication with respective ones of said input ports to sense said respective air pressure for each one thereof; a digital processor operatively coupled to each of said pressure sensors to digitally compute respective pressure ratios between said input ports and compare said ratios against designated pressure ratios corresponding to designated incident airspeed angles of incidence to output an airspeed incident angle and airspeed accordingly.

In one embodiment, the input ports are defined within a continuous leading surface of said airspeed sensor, and wherein said input ports are substantially linearly distributed along said leading surface to form respective angles of incidence around a common axis such that said airspeed incident angle is computed around said axis.

In one embodiment, the input ports are defined into respective sensor modules disposed or disposable so to substantially linearly distribute said sensor modules to form respective angles of incidence around a common axis such that said airspeed incident angle is computed around said axis.

In one embodiment, the airspeed sensor comprises a casing and wherein said respective pressure sensors are disposed within said casing.

In one embodiment, the digital processor is disposed in and operated from within said casing.

In one embodiment, the system further comprises a communication interface to externally communicate said airspeed incident angle and said airspeed to an external device.

In one embodiment, the airspeed sensor is integrated forward-facing within one of a bicycle helmet, a bicycle handle bar or a bicycle component.

In one embodiment, the airspeed sensor is integrated within a wearable component, the system further comprising a relative orientation sensor for monitoring an orientation of said wearable component relative to a direction of travel such that said airspeed incident angle is output relative to said direction of travel.

In accordance with another aspect, there is provided a helmet comprising: an integrated airspeed sensor comprising plural distinctly oriented input ports to capture a respective air pressure at each one thereof, and respective pressure sensors in fluid communication with respective ones of said input ports to sense said respective air pressure for each one thereof, wherein each of said pressure sensors are configured for operative coupling to a digital processor to digitally compute respective pressure ratios between said input ports and compare said ratios against designated pressure ratios corresponding to designated incident airspeed angles of incidence to output an airspeed incident angle and airspeed accordingly.

In one embodiment, the helmet further comprises a relative orientation sensor for monitoring an orientation of the helmet relative to a direction of travel such that said airspeed incident angle is output relative to said direction of travel.

In accordance with another aspect, there is provided an athletic component comprising: an integrated airspeed sensor comprising plural distinctly oriented input ports to capture a respective air pressure at each one thereof, and respective pressure sensors in fluid communication with respective ones of said input ports to sense said respective air pressure for each one thereof, wherein each of said pressure sensors are configured for operative coupling to a digital processor to digitally compute respective pressure ratios between said input ports and compare said ratios against designated pressure ratios corresponding to designated incident airspeed angles of incidence to output an airspeed incident angle and airspeed accordingly.

In one embodiment, the digital processor is integrated with said airspeed sensor.

In one embodiment, the component is selected from the group consisting of: bicycle handlebars, a bicycle stem, instrumented bicycle brifters, a helmet, a wearable component, body armour, skis, ski boots, or goggles.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 1 is a perspective view of a multiport airspeed sensor, in accordance with one embodiment;

FIG. 2 is a front elevation view of the multiport airspeed sensor of FIG. 1;

Figure 3:
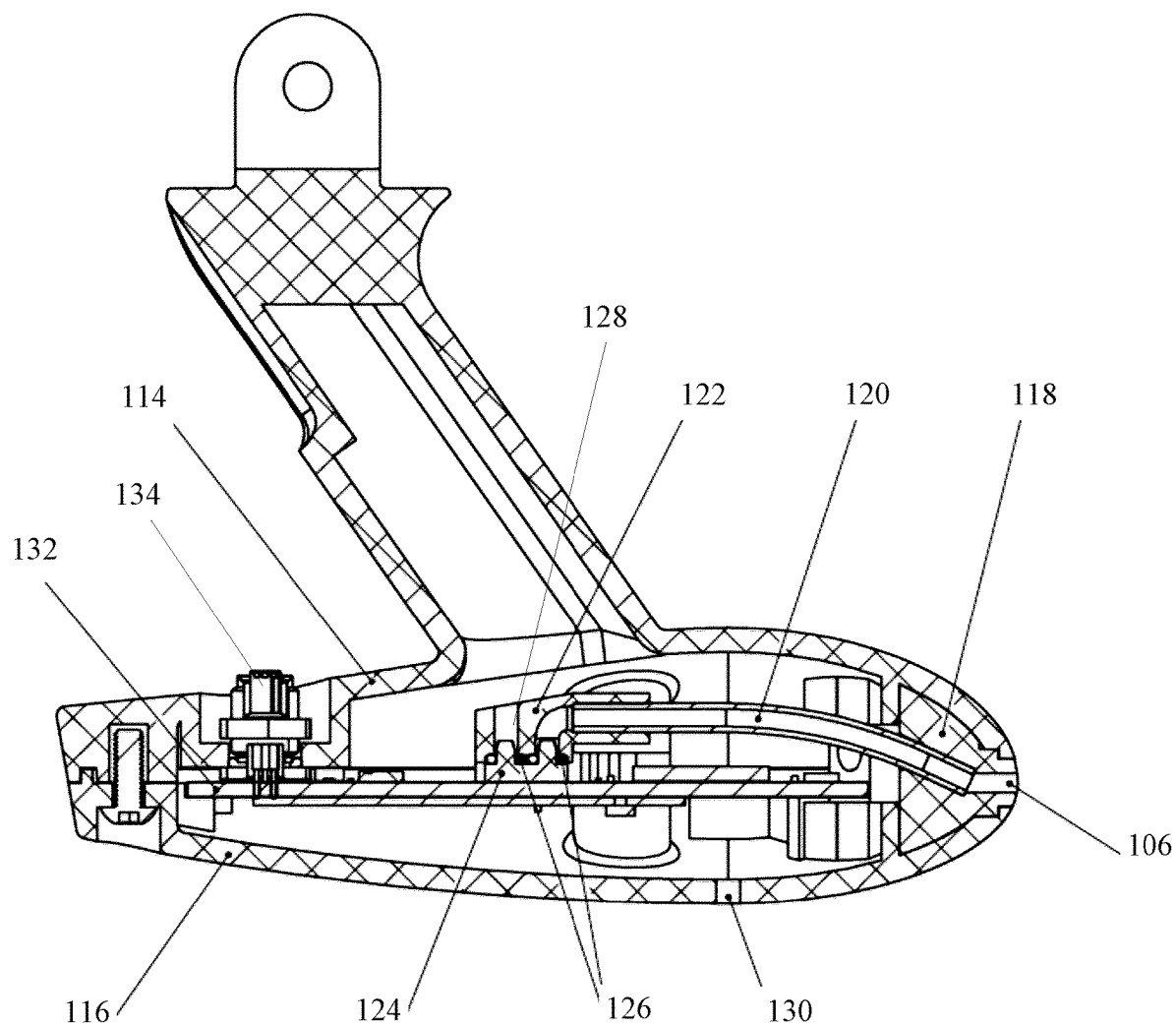
FIG. 3 is a side cross-sectional view of the multiport airspeed sensor of FIG. 2 taken along line A-A thereof.
Figure 4:
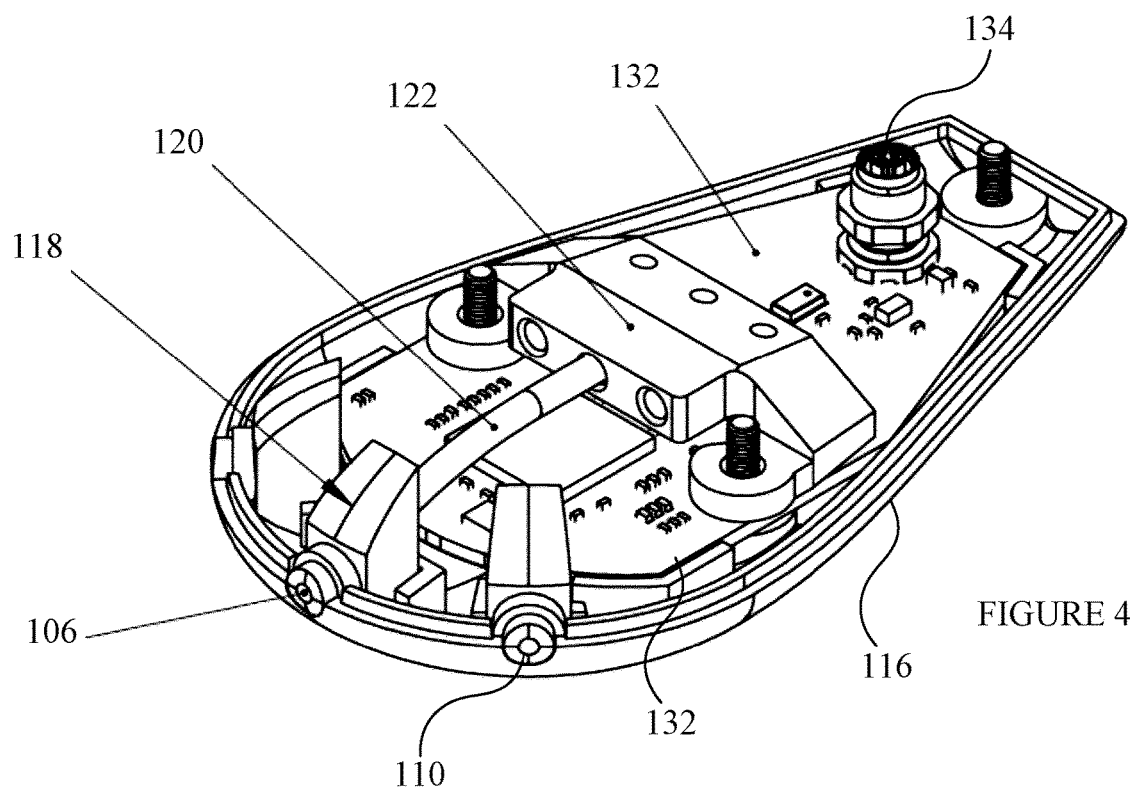
FIG. 4 is a perspective view of internal components of the multiport airspeed sensor of FIG. 1, in accordance with one embodiment.
Figure 5:
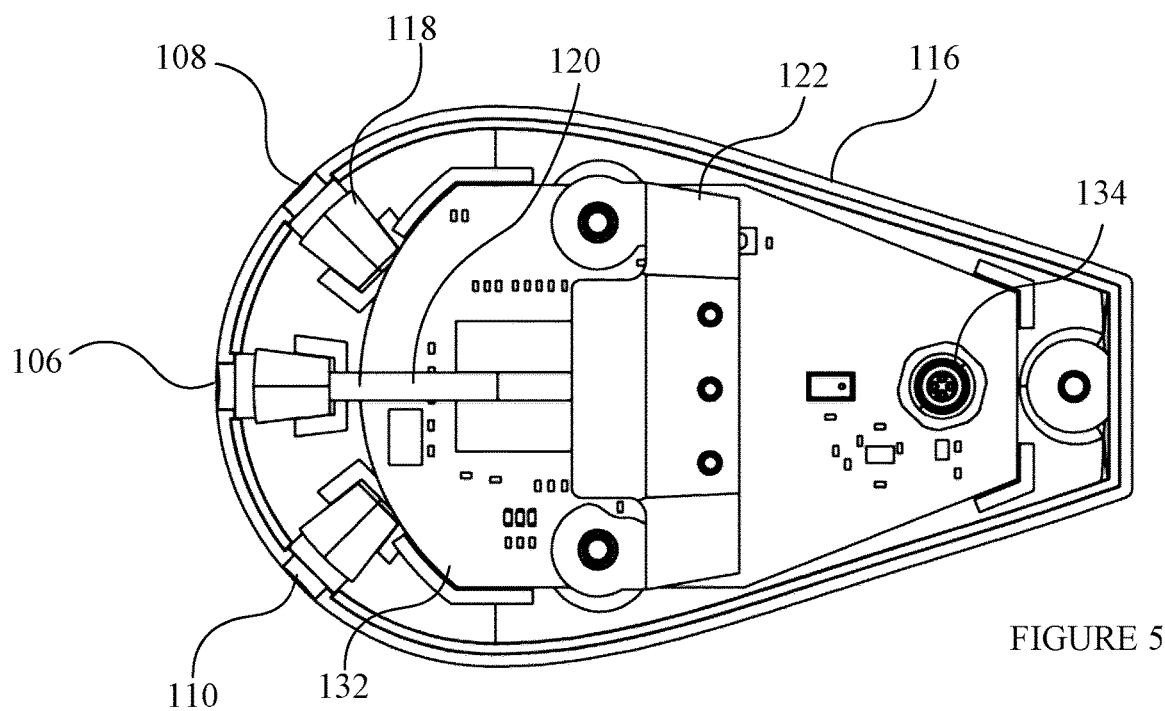
FIG. 5 is a top plan view of the internal components as shown in FIG. 4.
Figure 6:
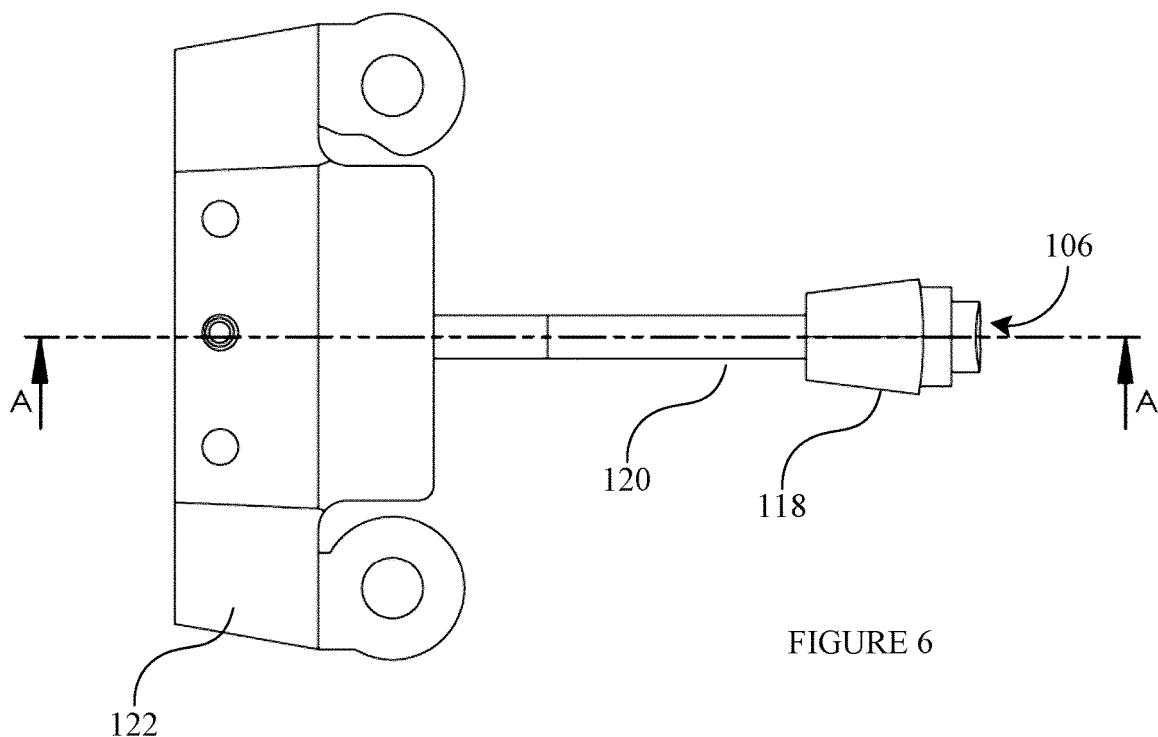
FIG. 6 is a top plan view of air path components of the multiport airspeed sensor of as shown in FIG. 4.
Figure 7:
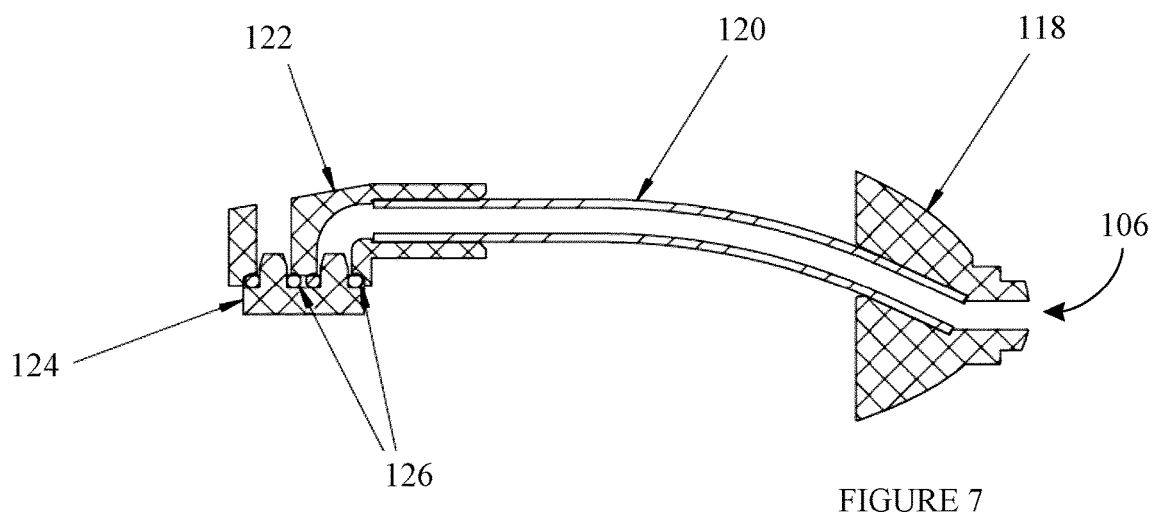
FIG. 7 is a side cross-sectional view of the air path components shown in FIG. 6 taken along line A-A thereof.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like) Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "of" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The following briefly describes various embodiments in order to provide a basic understanding of some aspects of the herein described technology. This brief description is not intended as an extensive overview. It is not intended to identify key or critical elements, or to delineate or otherwise narrow the scope. Its purpose is merely to present some concepts in a simplified form as a prelude to the more detailed description that is presented later.

In some of the herein-described embodiments, an airspeed sensor, system, and airspeed monitoring process digitally implemented thereby, are described. In accordance with one particular embodiment, a multiport airspeed sensor, as illustrated for example in FIGS. 1 to 5, and generally referred to herein using the numeral 100, comprises a sensor body 102 and a series of airspeed sensor inlet ports 104 distributed along a surface thereof to each discretely interface with an interfacing air speed at distinct relative interfacing angles. In this particular case, the airspeed sensor 100 comprises three (3) inlet ports consisting of a central port 106 and two (2) opposed side-angled ports 108, 110, thus providing for discrete air speed capture around an axis defined thereby that is, as will be described in greater detail below, useable in automatically and accurately determining an air speed and direction around this axis. Namely, where the sensor 100 is disposed so to orient the airspeed ports 104 on a lateral plane to define a substantially vertical axis, an interfacing air speed and Yaw angle may be accurately determined. Naturally, reorientation of the sensor may provide alternative directional airspeed information, as can the use of a distinctly oriented set of sensor ports be used to provide complementary directional information (e.g. complementary Yaw and Pitch angles).

As will be described in greater detail below, similar embodiments may include three or more (aligned) airspeed inlet ports, for example, four (4) ports distributed to include two pairs of opposed distinctly side-angled ports (e.g. see FIG. 27), five (5) ports distributed to include a central port and two pairs of opposed distinctly side-angled ports, or the like. Furthermore, the terms "sensor port", "inlet port" and/or "inlet" when interchangeably used herein with reference to the capture, sensing and/or processing of an interfacing or impacting relative air (or wind) speed will be understood to encompass different physical structures, shapes, configurations and/or apertures amenable to the effective and discrete receipt/input of interfacing airflows at discrete locations on the sensor body. These terms should not, thus, be interpreted or construed narrowly to be confined to the particular design shapes and/or configurations illustrated and referenced by the herein-described embodiments. Namely, while inlet ports are illustrated herein as discrete surface structures having generally circular inlet apertures, other concave, convex, or flush circular, oblong, rounded or otherwise shaped surface structures may be considered, as can other recessed and/or protruding port structures be considered, as will be readily appreciated by the skilled artisan, provided interfacing airflow(s) can be discretely captured at each port.

In general, multiport airspeed sensors as illustratively described herein can be operated to automatically determine a relative speed and direction of air impacting the multiport sensor, for example, by automatically evaluating relative pressure ratios between sensor ports. For example, the interfacing air speed and direction can be automatically calculated by first characterising a surface pressure distribution of the sensor body's given shape, and then using that pressure distribution to infer both air speed and direction.

In the following example, and with continued reference to the embodiment of FIGS. 1 and 2, air speed and direction are calculated using three (3) surface pressure measurements in discrete locations on the leading edge of the sensor body 102, notably at ports 104. As noted above, more pressure measurements can be used without departing from the general scope and nature of the present disclosure, for example, to statistically improve results and/or accuracy.

Figure 8:
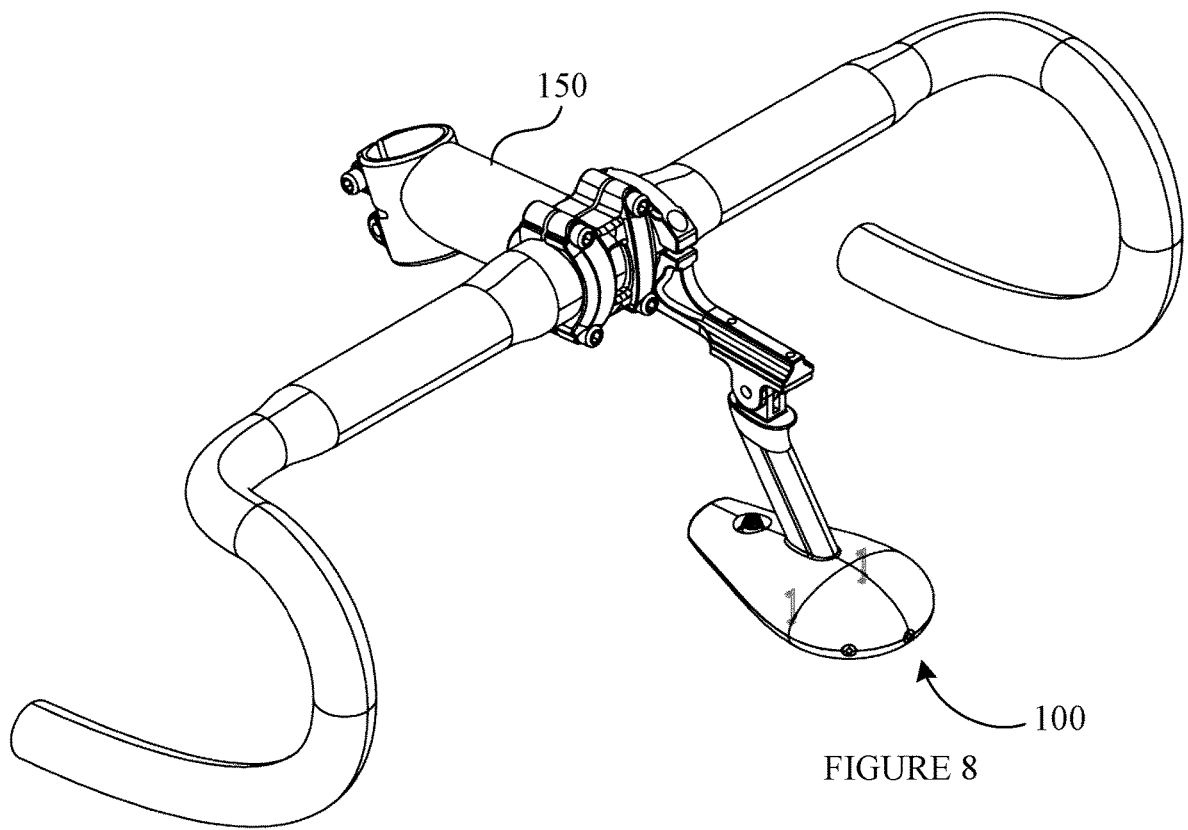
FIG. 8 is a perspective view of the multiport airspeed sensor of FIG. 1 when mounted to be suspended via a bicycle stem clamp, in accordance with one embodiment.
Figure 9:
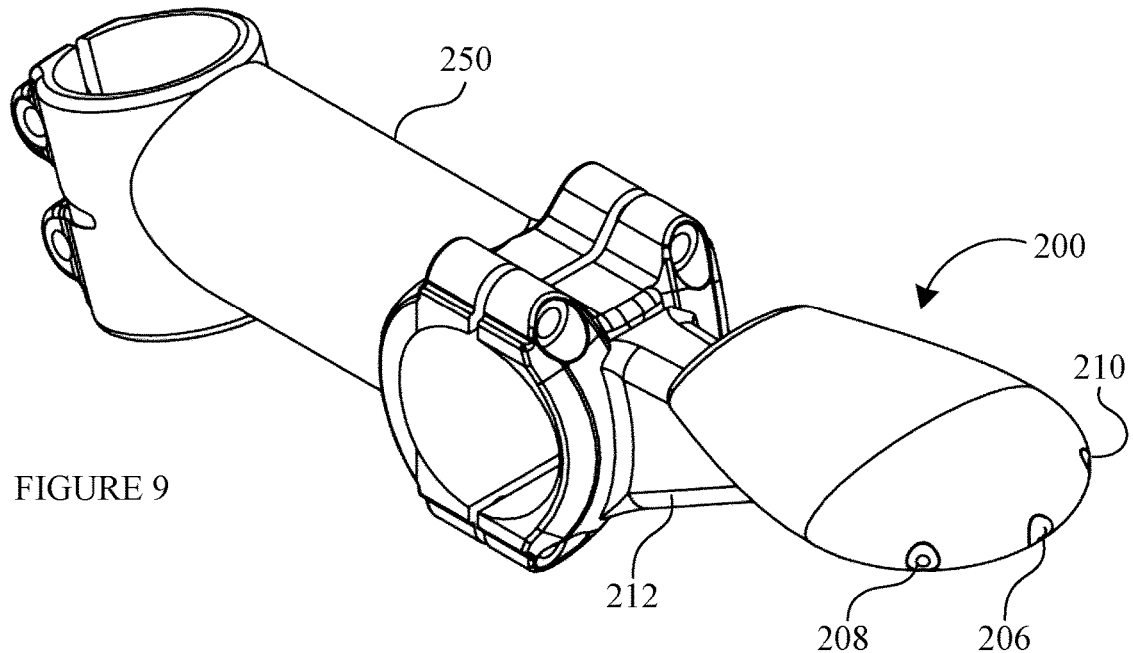
FIG. 9 is a perspective view of a multiport airspeed sensor when mounted to extend forward via a bicycle stem clamp, in accordance with another embodiment.

In the illustrated embodiment, the sensor 100 is mountable, in this example suspendable via a mounting arm 112, to a vehicle, equipment or live body so to be oriented in a forward-facing manner, whereby the central port 106 is generally oriented in a direction of travel and the side-angled ports 108, 110 are oriented at opposed relative angles thereto. In doing so, the sensor 100 may be used to measure and monitor a relative air speed and Yaw angle of the sensor relative to a direction of travel or movement, thus providing relative headwind information to the user. For example, as illustrated in FIG. 8, the sensor 100 may be mounted via mounting arm 112 to the stem 150 of bicycle handlebars 152, though may be otherwise mounted to the stem, handlebar and/or other parts of the bicycle (or other vehicle, equipment, user) via any one or more clamps, couplers, fittings, fixings, adhesives, or like coupling means as may be readily appreciated by the skilled artisan. For example, FIG. 9 shows a multiport sensor 200 having central (206) and opposed side-angled (208, 210) ports, in accordance with an alternative embodiment, that is otherwise directly coupled to a bicycle stem 250 via an integrated mounting structure 212.

As will be described in further details below, the airspeed sensor as contemplated herein in accordance with different embodiments, may include different mountable and/or integrated configurations, namely in different orientations and/or configurations on different internally and/or human powered, or self-propelled (e.g. gravity and/or water current propelled) athletic, recreational and/or multipurpose vehicles and/or equipment, so to provide, in some examples, useful performance feedback to an operator of such vehicles/equipment.

Examples of vehicles and/or equipment may include, but are not limited to, standard, electric and/or hybrid bicycles; watercrafts such as canoes, kayaks, paddle boards, or the like; snow sport equipment such as skies, snowboards, sleds, etc.; all-terrain vehicles (ATVs), dirt bikes, jet-skis, sailboats, or like recreational and/or multipurpose vehicles; recreational aircrafts such as paragliders, hang gliders, and/or like airborne equipment; and/or related equipment such helmets, clothing, body armour/pads, boots, skates, goggles/eyewear, etc.; or the like. Moreover, while the below-described examples are particularly directed to implementations and configurations amenable to cycling activities, with illustrated examples including mounted/mountable or integrated handlebar (FIGS. 8, 11 and 12), brifter (FIGS. 13 and 14) or helmet (FIGS. 15 to 20) embodiments, it will be appreciated that the embodiments and techniques described herein may be equally applicable in other contexts whereby user/operator feedback on wind speed and/or direction may be of interest and/or useful in evaluating and/or optimizing operation. For example, within the context of athletic and/or competitive equipment, directional wind speed information may be of particular interest in evaluating (human and/or external) power output and consumption, and possible improvements that can be made therein or in relation thereto based on various operating parameters, such as, but not limited to, body posture, technique, exertion level, direction of travel or route planning, relative power output levels, equipment design or selection, etc. Other such parameters will be readily apparent to the skilled artisan.

Naturally, while the illustrated embodiments generally contemplate a user/equipment in motion such that the multiport sensor provides relative headwind feedback, other embodiments may also or alternatively include static applications whereby wind speed and orientation are computed in a static (non-moving) frame of reference.

With particular reference to FIGS. 3 to 7, the multiport sensor 100 is generally configured to encase, via top and bottom enclosure portions 114 and 116, respective sensing port inserts, such as insert 118, in this embodiment, mechanically configured to define the respective inlet ports (e.g. central port 106) and join them to respective (flexible) inlet tubes, channels and/or passageways 120 (hereinafter generically referred to as inlet passageways), which in turn fluidly couple to a sensing port pressure manifold 122 and respective onboard differential pressure sensors 124. In alternative embodiments, the passageways 120 may otherwise be integrated or integrally formed with each inlet port insert and/or manifold 122, as can other mechanical arrangements be considered without departing from the general scope and nature of the present disclosure.

In the illustrated embodiment, the manifold 122 engages each respective differential pressure sensor 124 inlet via a sealed coupling including O-rings 126. An outlet 128 of the differential pressure sensor 124 is exposed to an internal case pressure, which, in one embodiment, can be used as a common reference pressure for all pressure sensors 124.

In the illustrated embodiment, the sensor 100 further comprises a static port 130 to vent the internal case volume to external air on a surface that is substantially tangential to the expected interfacing airflow. As will be discussed in greater detail below, however, some of the herein-described embodiments are operable without a static or tangential port, that is, operating instead on the basis of a common reference pressure between sensor ports. These and other such considerations will be discussed in greater detail below.

Onboard electronics, such as printed circuit board (PCB) assembly 132, are also included in this embodiment to pre- or fully process raw differential pressure data, as well as an external data port 134 to relay such data to an external computer or processor (not shown). It will be appreciated that while a hardwired data port 134 (e.g. canbus cable port) is illustrated in this example, similar embodiments may also or otherwise include a wireless transmitter/transceiver (Wi-Fi, Bluetooth, NFC, ANT+, etc.). In some embodiments, the sensor 100 may also or alternatively include a full onboard processor/controller/computer and user interface, for example, so to output airflow measurements and/or data directly thereon, as can other configurations and/or permutations be considered, as will be described in greater detail below.

Figure 10:
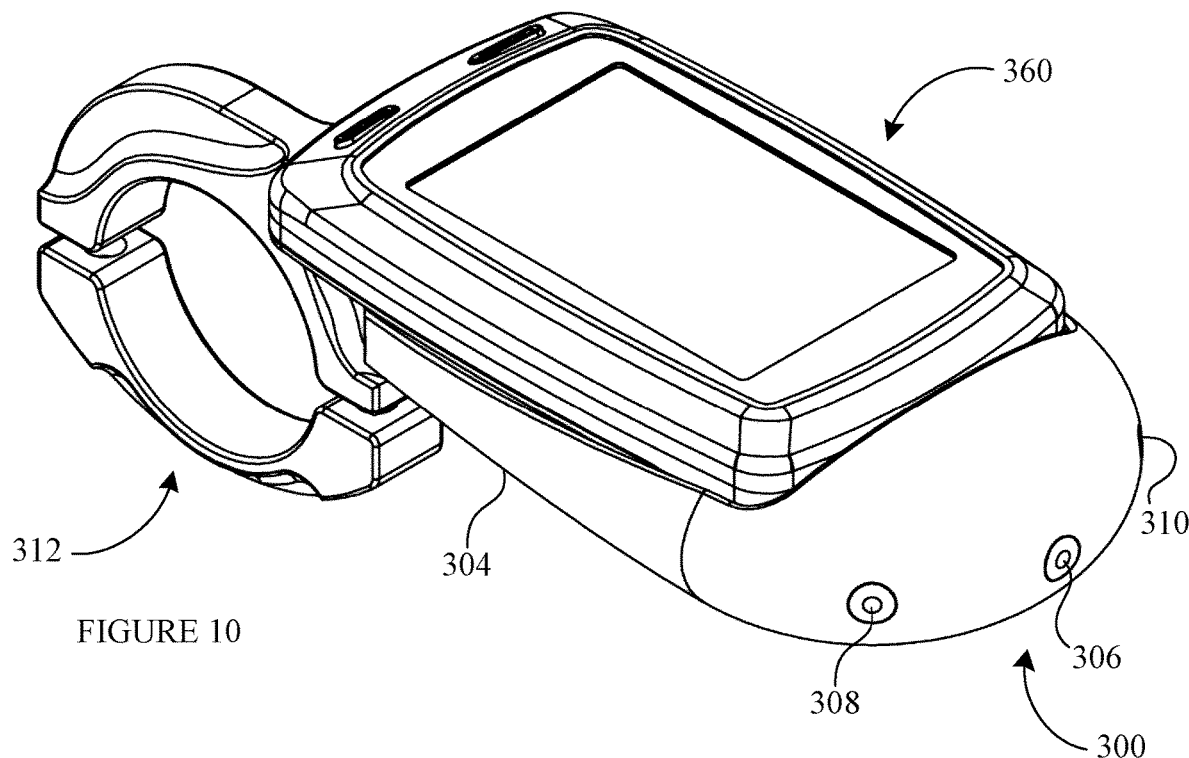
FIG. 10 is a perspective view of a multiport airspeed sensor having an integrated computer, in accordance with one embodiment.
Figure 11:
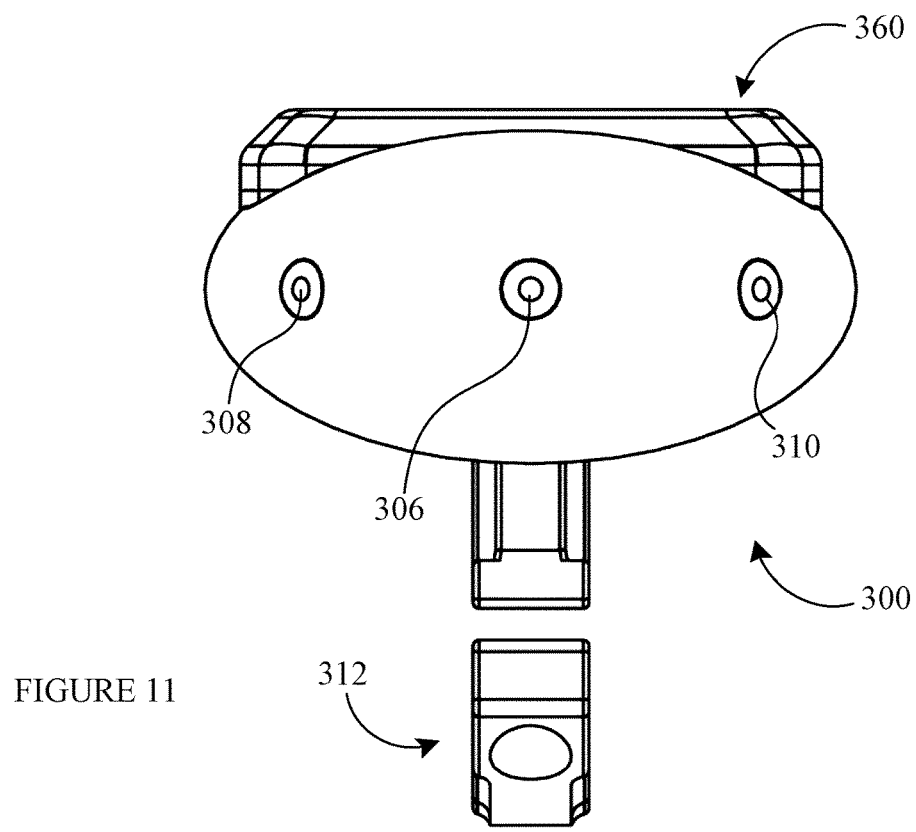
FIG. 11 is a front elevation view of the multiport airspeed sensor of FIG. 10.

For example, FIGS. 10 and 11 show an embodiment of a multiport sensor 300 having a central (306) and opposed side-angled (308, 310) ports, in accordance with another embodiment, that is configured to (removably) receive mechanically nested therein a digital computing device 360, such as an athletic performance or monitoring unit. In this embodiment, the computing device 360 may be electronically coupled to the sensor 300 via one or more corresponding hardwired data couplers and/or leads so to provide for a hardwired relay of data to and/or from the sensor 300, and/or provide electrical (e.g. battery) power from either one to the other. Alternatively, the computing device 360 may be (removably) mechanically nested within the sensor casing 304 while otherwise exchanging data with the sensor 300 via one or more wireless links (as discussed above). The sensor 300 also comprises an alternative clamping mechanism 312, which can be used to mount the integrated sensor 300 to different tubular/cylindrical (in this example) components/equipment. Again, as noted above, different wearable, mountable and/or attachments mechanisms may be considered in this and related embodiments without departing from the general scope and nature of the present disclosure.

Figure 25:
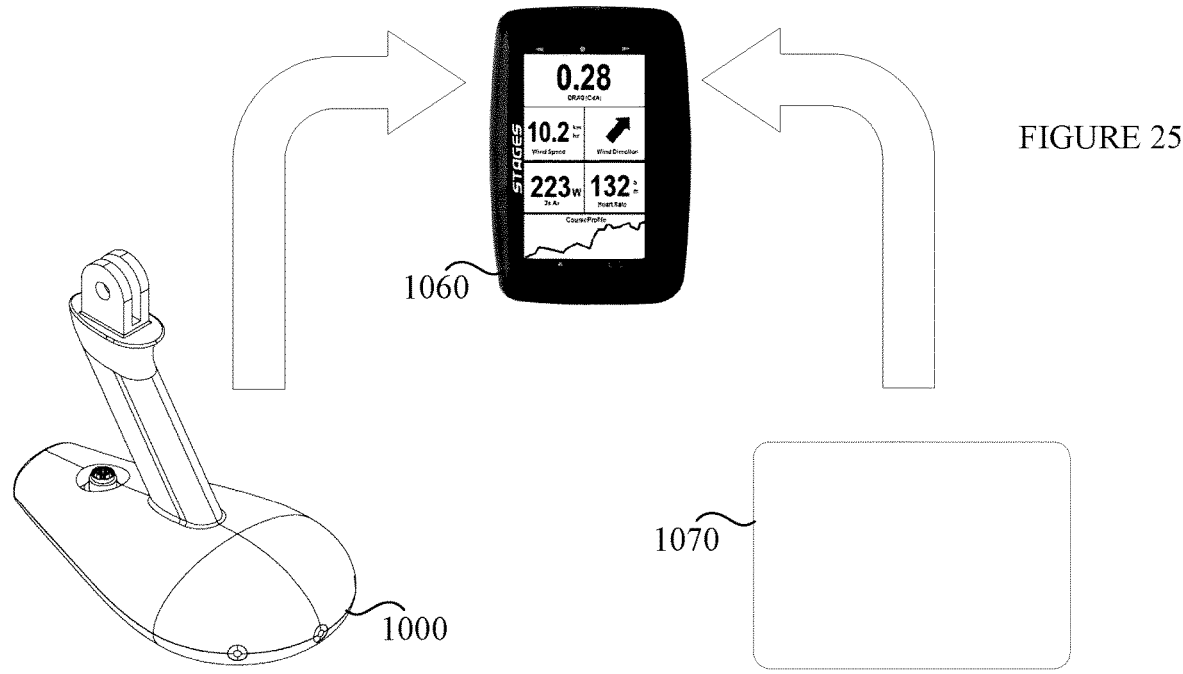
FIG. 25 is a diagram of an athletic wind drag measuring system comprising an airspeed sensor, in accordance with one embodiment.

With reference to FIG. 25, and in accordance with one embodiment, an airspeed sensor system is illustrated in which a multiport airspeed sensor 1000 is operable to communicate (wired or wireless) with a paired computing device 1060. In this example, one or more additional sensor subsystems 1070 are also included to monitor related performance parameters and relay such parameters to the computing device 1060. For example, complementary sensor subsystems 1070 may include, but are not limited to, any one or more of a power meter (e.g. bicycle crank or pedal power meter, oarlock rowing power meter, etc.), a speed/distance meter (e.g. wheel speed sensor, inertial sensors, GPS, etc.), a physiological sensor (e.g. heart rate monitor, blood oxygen monitor, or like physiological exertion/performance monitors), or the like. In the illustrated example, each sensor/monitor 1000, 1070 is communicatively coupled to computing device 1060 via a wireless link, such as a Bluetooth™ or ANT+ link. In this configuration, data acquired, monitored and/or processed by each subsystem can be communicatively relayed to the computing device 1060 for output and user consumption.

Figure 26:
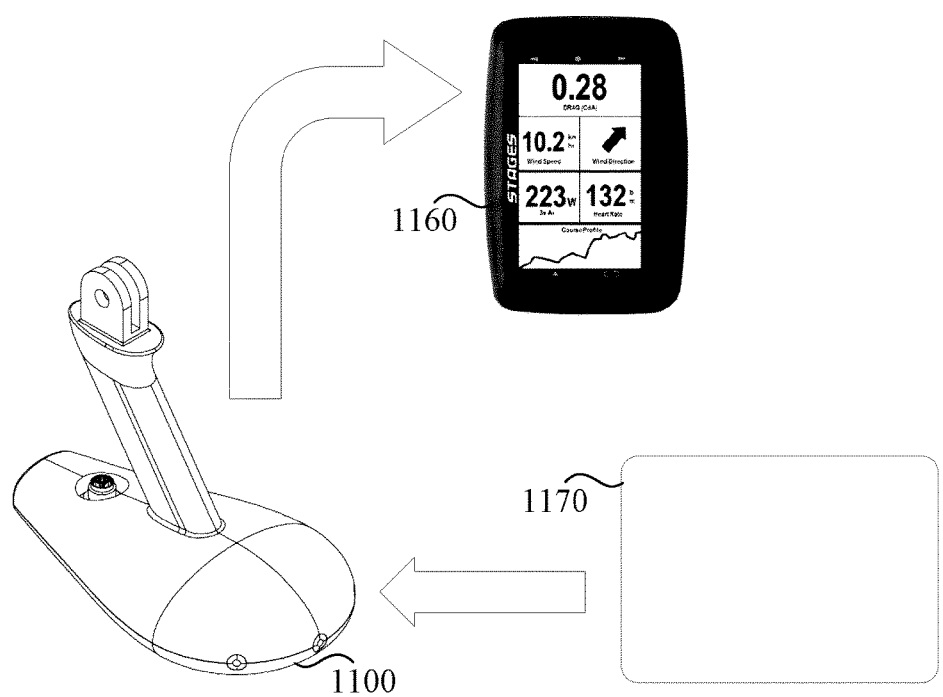
FIG. 26 a diagram of an athletic wind drag measuring system comprising an airspeed sensor, in accordance with another embodiment.

With reference to FIG. 26, and in accordance with another embodiment, an airspeed sensor system is illustrated in which a multiport airspeed sensor 1100 is operable to communicate (wired or wireless) directly with a paired computing device 1160 and one or more additional sensor subsystems 1170. In this example, these additional sensor subsystems first communicate their data to the airspeed sensor 1100 (e.g. via a wired or wireless link), which can act as a sensor data hub for example, and, optionally, perform certain cross-sensor computations, to output combined or parallel data outputs to computing device 1160, again via a wired or wireless link. Accordingly, operation of the computing device 1160 may be limited or focused on digital data display or output, whereas airspeed sensor 1100 can be operated as a data center or hub to consolidate distinct data sources and optionally combine at least some of them to provide more comprehensive results, data or parameters. For example, in one embodiment, various sensor inputs, such as ground speed, user input power (e.g. power meter output), incident airspeed, acceleration, inclination, etc. may be combined by the sensor 1100 in one or more combinations, and in accordance with one or more user performance or environmental metrics, to output further information to the user and/or computing device 1160. For example, various environmental and/or user measurements may be combined to output feedback on an aerodynamic drag value (CdA) or coefficient (Cd) and its variation with respect to user and/or equipment configuration, alignment and/or operation, for instance, as described in co-pending Canadian Patent Application No. 3,002,186 filed Apr. 19, 2018, the entire contents of which are hereby incorporated herein by reference. Such computations may also or alternatively be compiled by the computing device 1170 or other such devices.

Other system configurations and/or implementations may be considered, as will be readily appreciated by the skilled artisan, without departing from the general scope and nature of the present disclosure.

Figure 12:
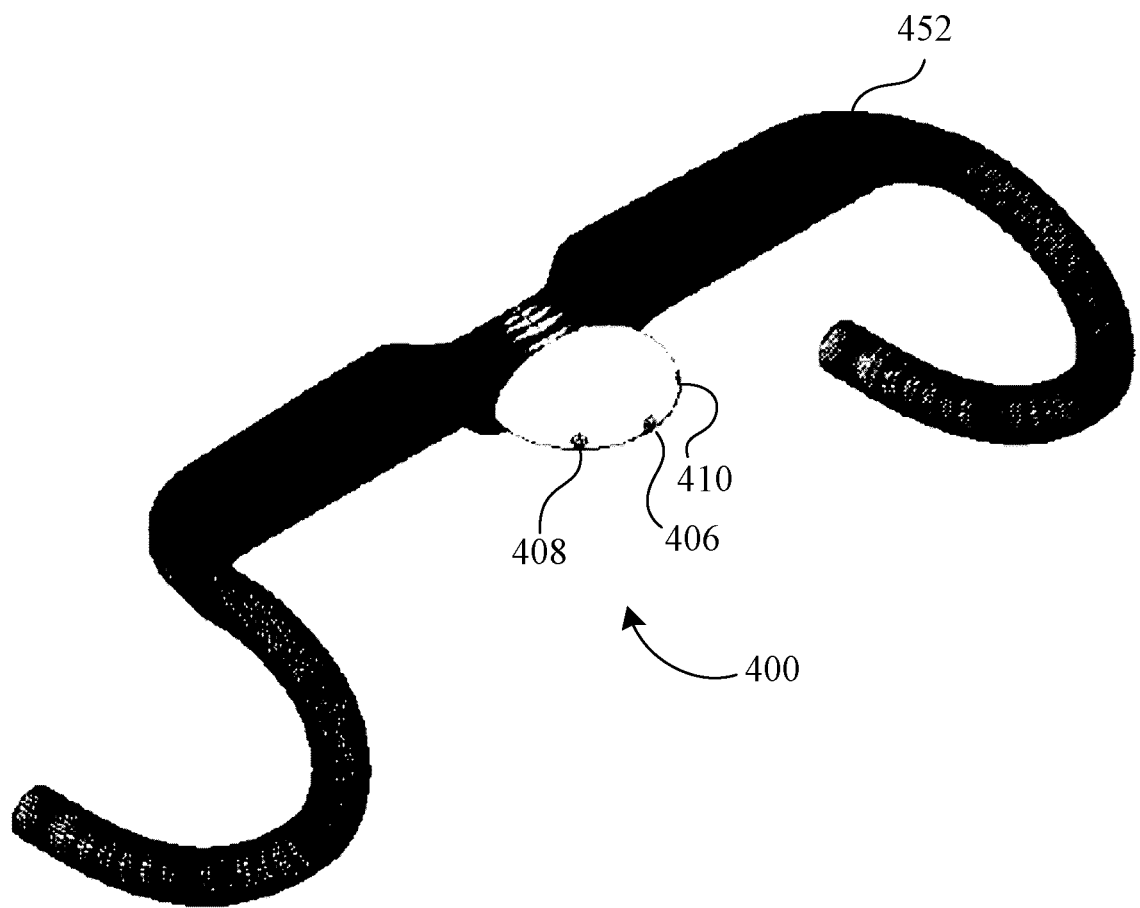
FIG. 12 is a perspective view of a multiport airspeed sensor integrated with bicycle handlebars, in accordance with one embodiment.

With reference to FIG. 12, and in accordance with another embodiment, a multiport airspeed sensor 400 having, again, a central (406) and opposed side-angled (408, 410) airspeed inlet ports, is integrated with bicycle handlebars 450. In this embodiment, hardware required to process inlet airflows and communicate processed data for user consumption may be integrated within the sensor body 404, as above, and/or be fully/partially integrated within various elements of the handlebars 450. For example, instrumented handlebars 450 may be configured to encase or support various digital processing, communication and/or display equipment to interface with the multiport sensor 400 and/or other integrated and/or digitally coupled devices.

Figure 13:
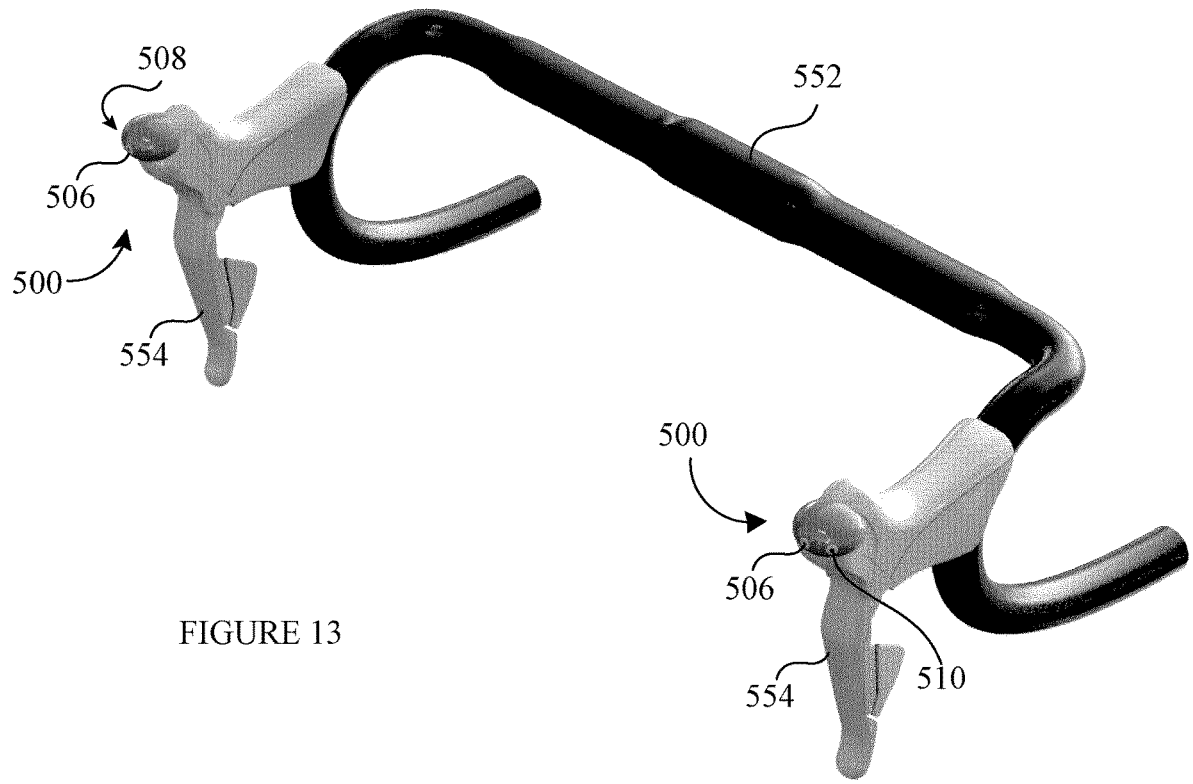
FIG. 13 is a perspective view of brifter-integrated airspeed sensor components, in accordance with one embodiment.

With reference to FIG. 13, and in accordance with another embodiment, a pair of dual-port airspeed sensors 500 each having a central (506) and a respective opposed side-angled airspeed inlet port (508, 510), are integrated with respective bicycle brifters 554 (combined brakes/shifters) mounted to bicycle handlebars 552. In this embodiment, the respective sensors 500 may work in concert to provide similar results as for embodiments described above. For instance, a common reference pressure can be taken for both sensors 500 from an internal handlebar conduit or volume that is in fluid communication with differential pressure sensors integrated within each sensor or brifter body, for example, as can other configurations be considered without departing from the general scope and nature of the present disclosure.

In this embodiment, hardware required to process inlet airflows and communicate processed data for user consumption may be integrated within the respective sensor bodies (e.g. and respectively processed, alone or in combination, via another onboard or wearable computing device or the like), as above, and/or may be fully/partially integrated within various elements of the brifters 554 and/or handlebars 552. For example, instrumented brifters/handlebars may be configured to encase or support various airflow, digital processing, communication and/or display equipment to interface with the multiport sensors 500 and/or other integrated and/or digitally coupled devices.

Figure 14:
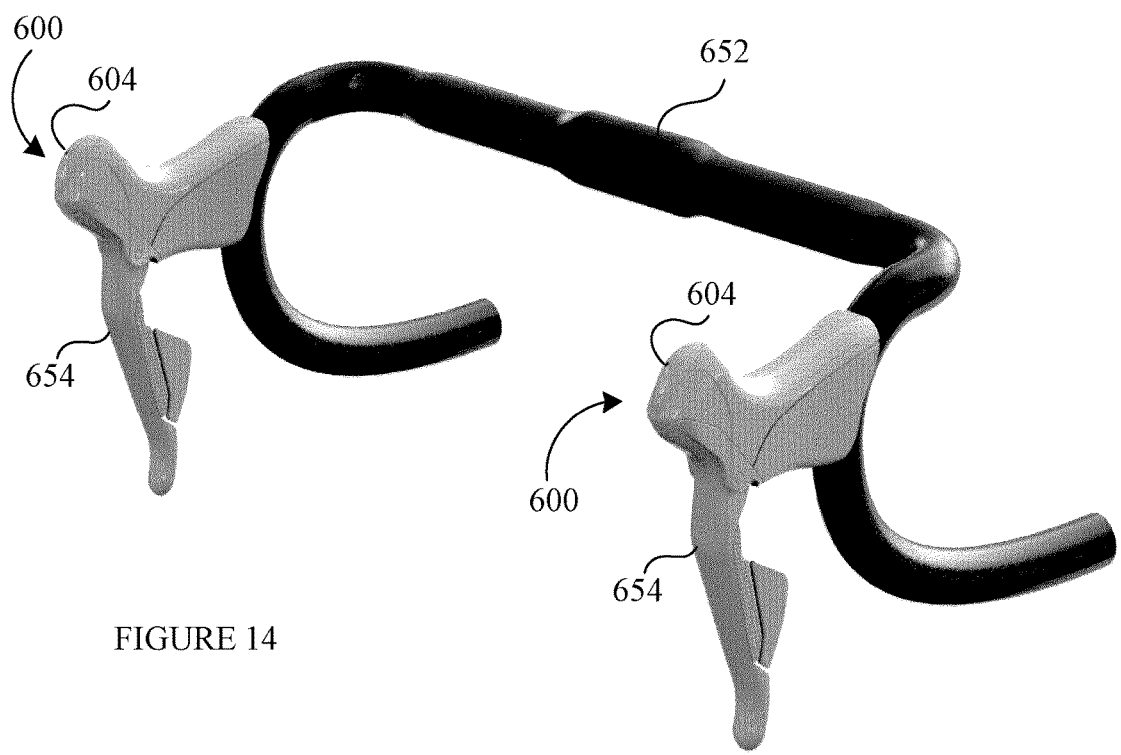
FIG. 14 is a perspective view of brifter-integrated multiport airspeed sensor components, in accordance with another embodiment.

With reference to FIG. 14, and in accordance with another embodiment, a pair of single port airspeed sensors 600, each having a single inlet port (604) are integrated with respective bicycle brifters 654 (combined brakes/shifters) mounted to bicycle handlebars 652. In this embodiment, the respective single port airspeed sensors 600 may work in concert, optionally with an integrated handlebar single port sensor (not shown, but generally mounted/integrated as illustrated in the embodiment of FIG. 12) to provide similar results. For example, a forward-facing single-port handlebar sensor could be cooperatively operated with the pair of single port airspeed sensors 600, themselves oriented to provide opposed side-angled port directions, so to provide comparable results to those available with a combined multiport sensor as described above. Again, a common reference pressure can be taken for all sensors from an internal handlebar conduit or volume that is in fluid communication with differential pressure sensors integrated within each sensor or brifter body, for example, as can other configurations be considered without departing from the general scope and nature of the present disclosure. Once again, hardware required to process inlet airflows and communicate processed data for user consumption may be integrated within the respective sensor bodies 604 (e.g. and respectively processed, alone or in combination, via another onboard or wearable computing device or the like), as above, and/or may be fully/partially integrated within various elements of the brifters 654 and/or handlebars 652. For example, instrumented brifters/handlebars may be configured to encase or support various airflow, digital processing, communication and/or display equipment to interface with the multiport sensors 600 and/or other integrated and/or digitally coupled devices.

It will be appreciated that while dual-port and single-port examples are described above, other configurations may include a single or a pair of redundant multiport brifter sensors and/or cooperative implementation with a handlebar (or otherwise integrated/mounted) sensor having two or more inlet ports. Other airspeed sensor integrations with other parts or components of a bicycle can be contemplated, as can integrations with different athletic or competitive vehicle parts and/or components (e.g. watercrafts, snow crafts, athletic/wearable equipment, etc.).

Figure 15:
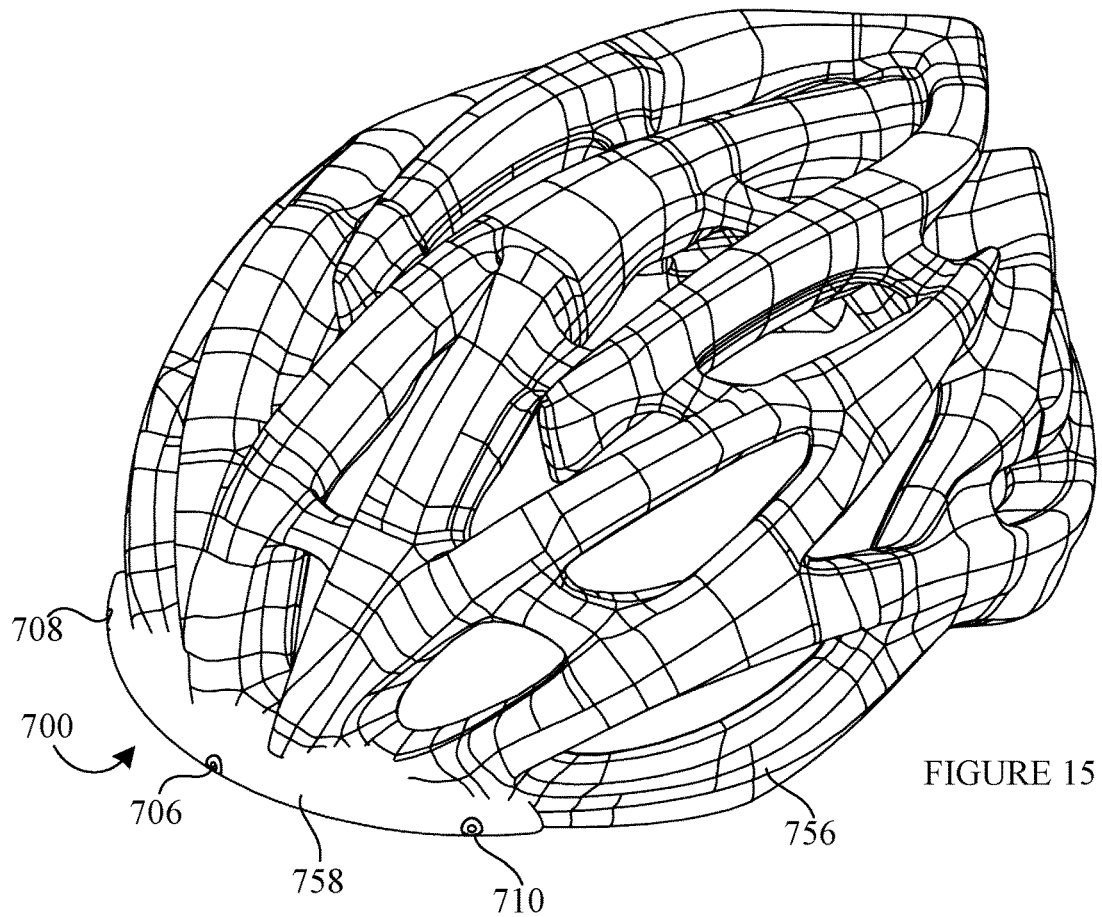
FIG. 15 is a perspective view of a multiport airspeed sensor integrated within a bicycle helmet visor, in accordance with one embodiment.
Figure 16:
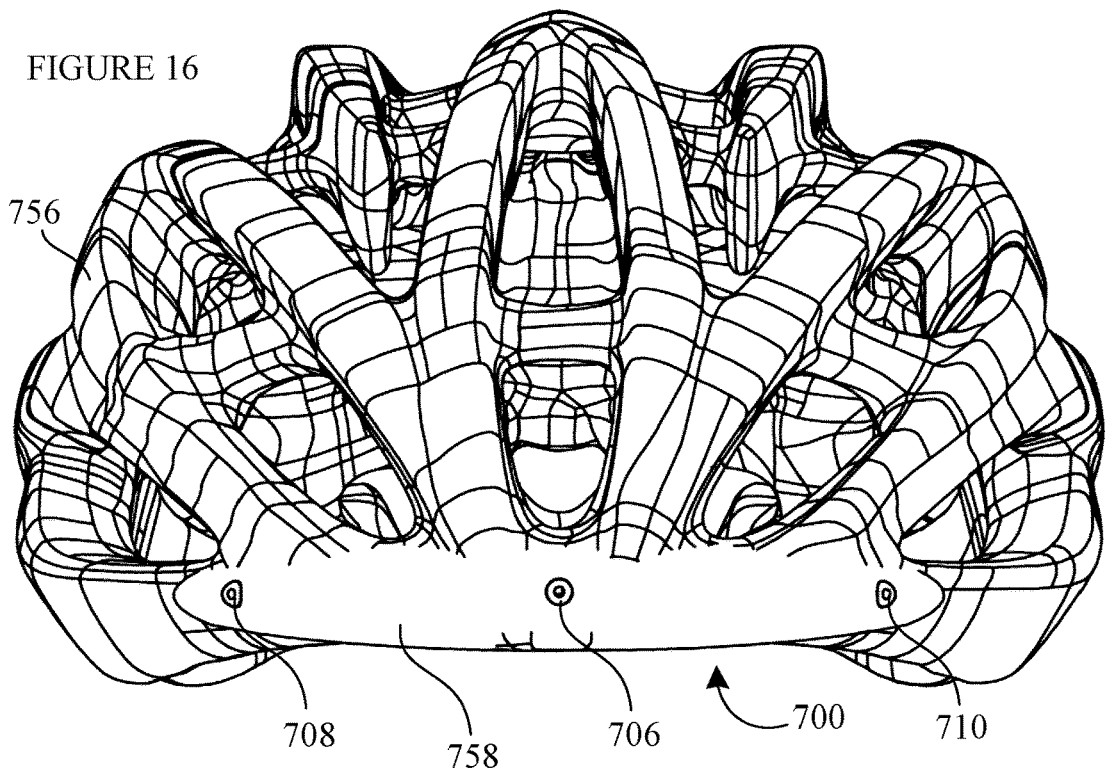
FIG. 16 is a front elevation view of the multiport airspeed sensor of FIG. 15.

With reference to FIGS. 15 and 16, and in accordance with another embodiment, a multiport airspeed sensor 700 having, again, a central (706) and opposed side-angled (708, 710) airspeed inlet ports, is integrated with bicycle helmet 756, for example, within a helmet visor 758. In this embodiment, hardware required to process inlet airflows and communicate processed data for user consumption may be integrated within the sensor body, as above, and/or be fully/partially integrated within various elements of the helmet 756. For example, an instrumented helmet 756 may be configured to encase or support various digital processing, communication and/or display equipment to interface with the multiport sensor 700 and/or other integrated and/or digitally coupled devices. In some embodiments, so to compute and output an airspeed incident angle relative to a direction of travel of a wearer of the helmet (rather than relative to an orientation of the helmet itself), the helmet 700 may include an integrated or mounted orientation sensor for monitoring an orientation thereof relative to a direction of travel. Accordingly, airspeed data may be more usefully output as a function of the direction of travel by taking into account a real-time orientation of the helmet in relation thereto. In one example, an orientation monitoring means may include, but is not limited to, a 9 degree of freedom accelerometer, gyroscope and/or magnetometer. Other techniques for monitoring and accounting for a relative orientation of the helmet (or other wearable components upon which the airspeed sensor may be disposed) relative to a direction of travel may also be considered, as will be readily appreciated by the skilled artisan.

Figure 17:
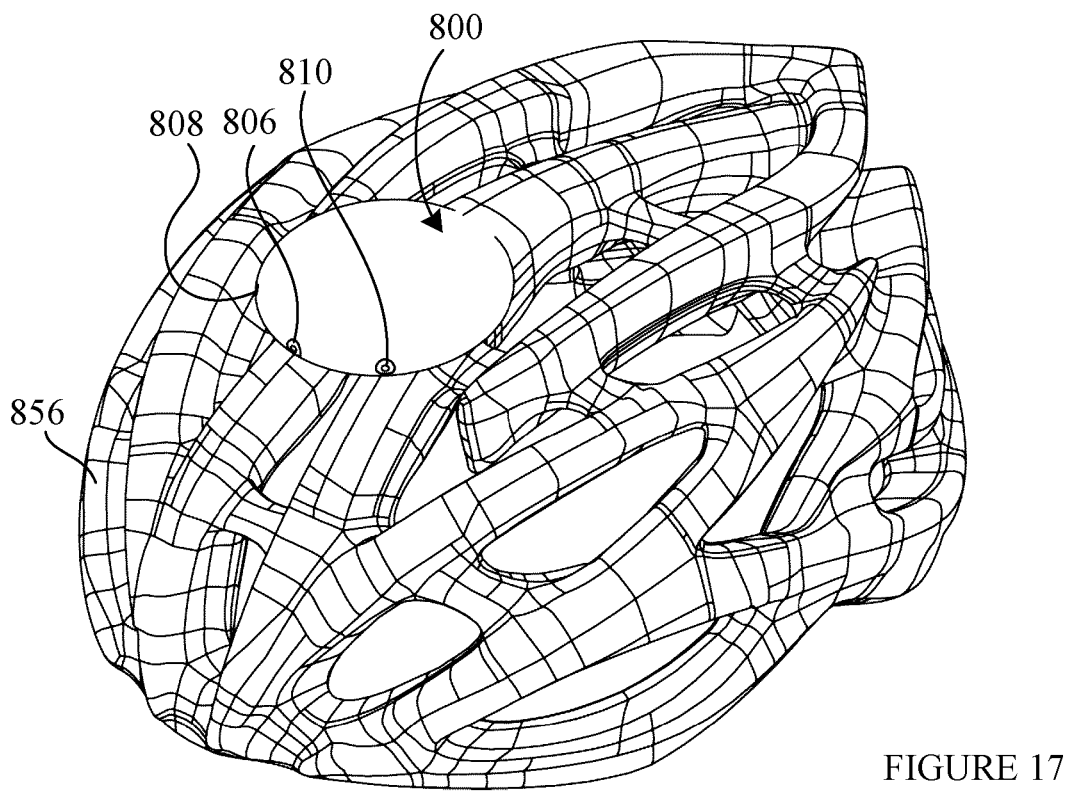
FIG. 17 is a perspective view of a bicycle helmet-integrated multiport airspeed sensor, in accordance with another embodiment.
Figure 18:
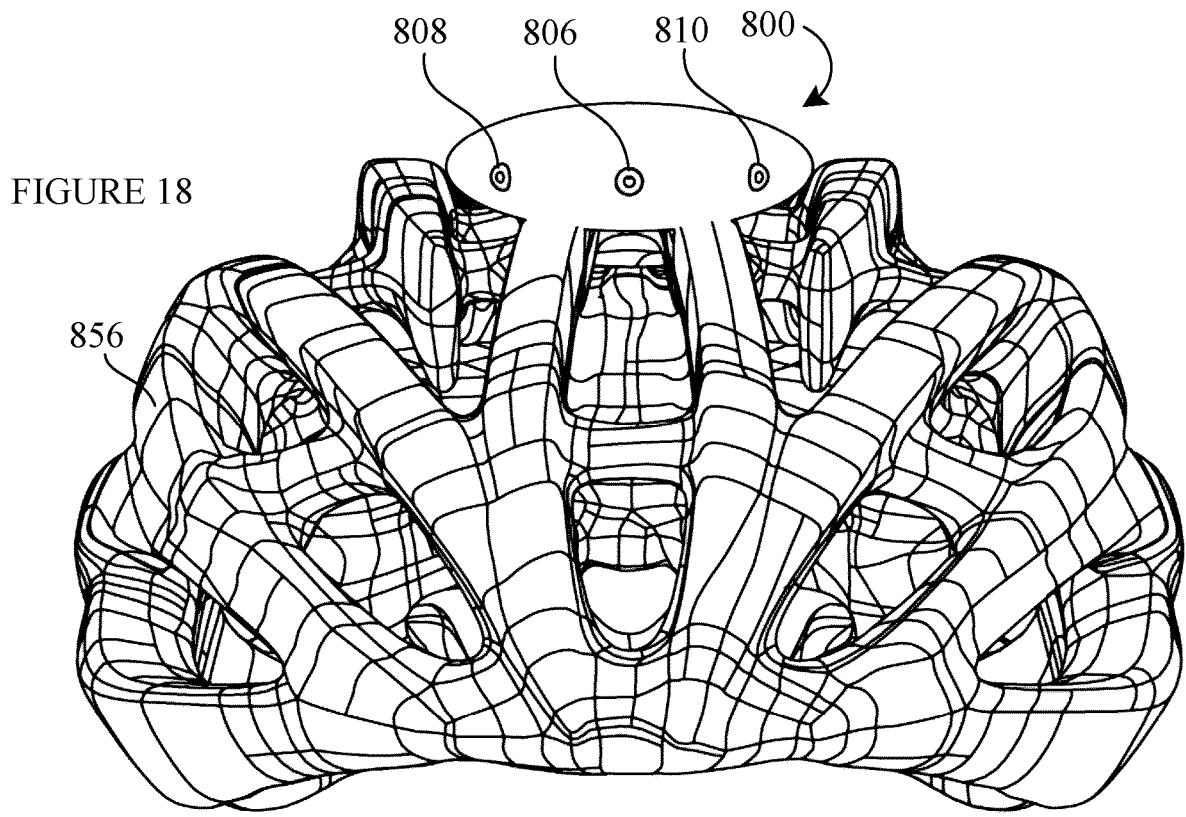
FIG. 18 is a front elevation view of the bicycle helmet-integrated multiport airspeed sensor of FIG. 17.

With reference to FIGS. 17 and 18, and in accordance with another embodiment, a multiport airspeed sensor 800 having, again, a central (806) and opposed side-angled (808, 810) airspeed inlet ports, is integrated with bicycle helmet 856. In this embodiment, hardware required to process inlet airflows and communicate processed data for user consumption may be integrated within the sensor body, as above, and/or be fully/partially integrated within various elements of the helmet 856. For example, an instrumented helmet 856 may be configured to encase or support various digital processing, communication and/or display equipment to interface with the multiport sensor 800 and/or other integrated and/or digitally coupled devices.

Figure 19:
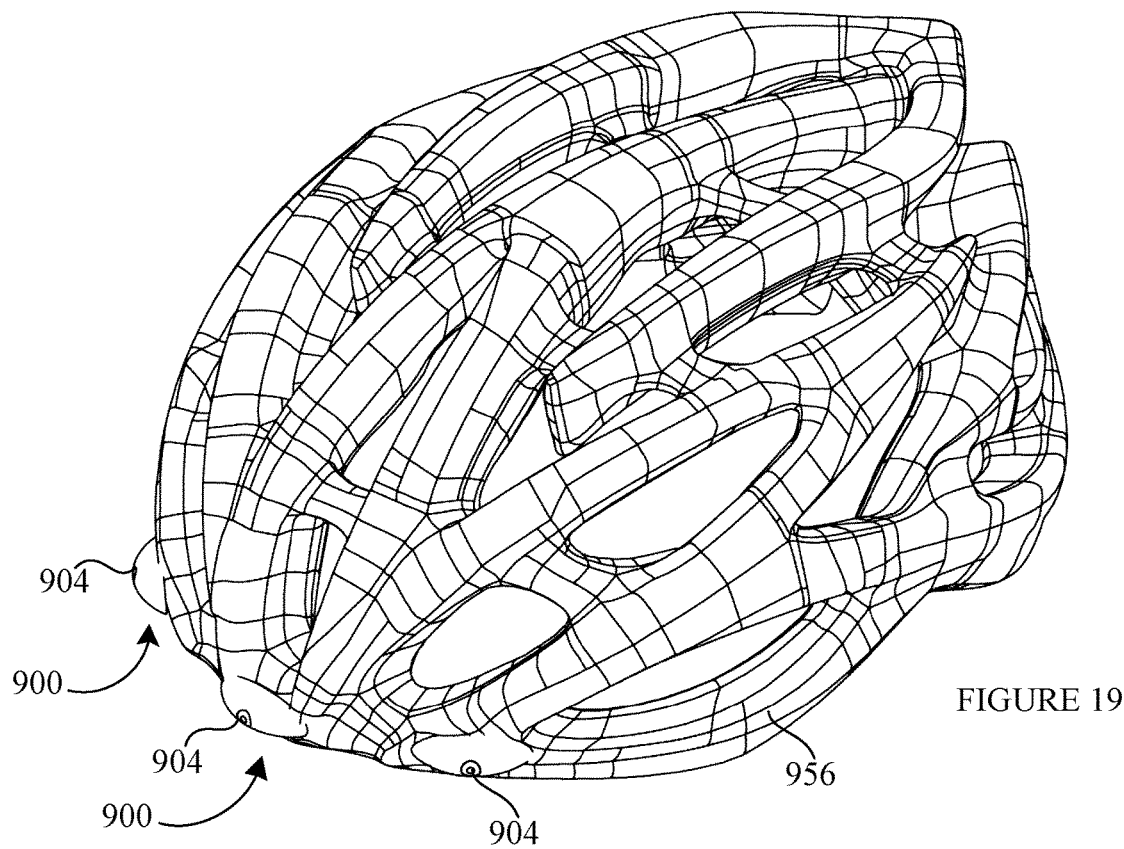
FIG. 19 is a perspective view of a bicycle helmet-integrated multiport airspeed sensor, in accordance with another embodiment.
Figure 20:
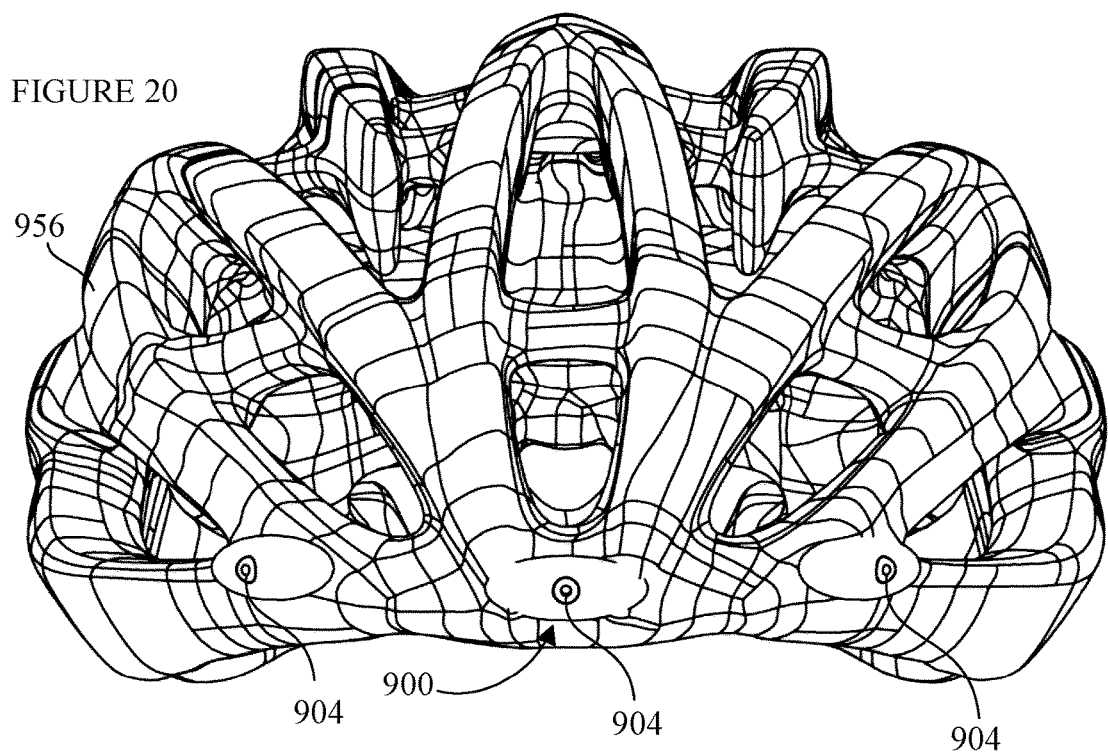
FIG. 20 is a front elevation view of the bicycle helmet-integrated multiport airspeed sensor of FIG. 19.

With reference to FIGS. 19 and 20, and in accordance with another embodiment, a set of single port airspeed sensors 900, each having a single inlet port (904) are integrated or mounted to a bicycle helmet 956. As in the embodiment described above with reference to FIG. 14, the respective single port airspeed sensors 900 may work in concert to provide similar results. For example, by orienting each sensor 900 to combine a central forward-facing sensor with opposed side-angled sensors, comparable results to those available with a combined multiport sensor as described above may be achieved. Again, a common reference pressure can be taken for all sensors from an internal helmet conduit or volume that is in fluid communication with differential pressure sensors integrated within each sensor body, for example, as can other configurations be considered without departing from the general scope and nature of the present disclosure. Once again, hardware required to process inlet airflows and communicate processed data for user consumption may be integrated within the respective sensor bodies (e.g. and respectively processed, alone or in combination, via another onboard or wearable computing device or the like), as above, and/or may be fully/partially integrated within various elements of the helmet, for example For example, an instrumented helmet may be configured to encase or support various airflow, digital processing, communication and/or display equipment to interface with the respective sensors 900 and/or other integrated and/or digitally coupled devices.

As discussed above, by combining airspeed readings from three or more inlet ports, for instance, via respective relative pressure sensors having a common reference pressure, for example, accurate readings and output of a relative airspeed and airspeed direction may be computed (e.g. relative to a direction of travel or relative to a static sensor). Given illustrative implementations described herein, an accurate static pressure measurement is not required to compute accurate incident airspeed and airspeed angle values. Rather, when operating distinct port-specific differential pressure sensors, a common reference pressure may be used, for instance, that may be internal or external to the sensor casing, for example Accordingly, where a reference port is used to sample an external reference pressure, a location and configuration of this port becomes less impactful on an overall operation of the airspeed sensor, notably, as all port-specific readings can be accurately compared to this same reference point without requirement for an accurate static port as commonly required with forward facing high speed solutions such as pitot tubes (i.e. in which static ports must typically be disposed on a surface tangential to a clean laminar flow and typically orthogonally oriented relative to a stagnation port orientation).

Accordingly, restrictions on airspeed sensor casing design, shape and/or configurations are mitigated as common requirements for clean, non-turbulent static pressure port readings become unnecessary, which is also conducive to operation of the herein-described embodiments in slower traveling or even static applications where relative airspeeds (wind) are lower, and where airspeed directionality becomes of greater relevance (i.e. as opposed to high speed applications, such as for air travel, where an incident airspeed component greatly outweighs in relevance any potential crosswind components).

Indeed, the design and location of an airspeed sensor for operation in lower speed applications where a true static port configuration can be conceived for all incident relative airspeed directions (e.g. for all relative wind directions and/or directions of travel) can be problematic. Operating from a common but possibly non-static reference port or reading can also accommodate further implementations and design integrations, as detailed and exemplified herein, that would otherwise be particularly difficult if not impossible to implement when requiring a strictly static reference port reading. For instance, as described herein, a reference pressure reading can be captured via an external reference port, or again captured internally (e.g. from within a sensor casing), such that a sealed sensor design may be more readily conceived. This bears significant advantages in various athletic or competitive outdoor activities where a substantively sealed sensor can be more readily fabricated and dispatched for use in inclement weather with reduced risk of inadvertent exposure of internal electronics to such inclement weather. Other such examples may readily apply without departing from the general scope and nature of the present disclosure.

Figure 21:
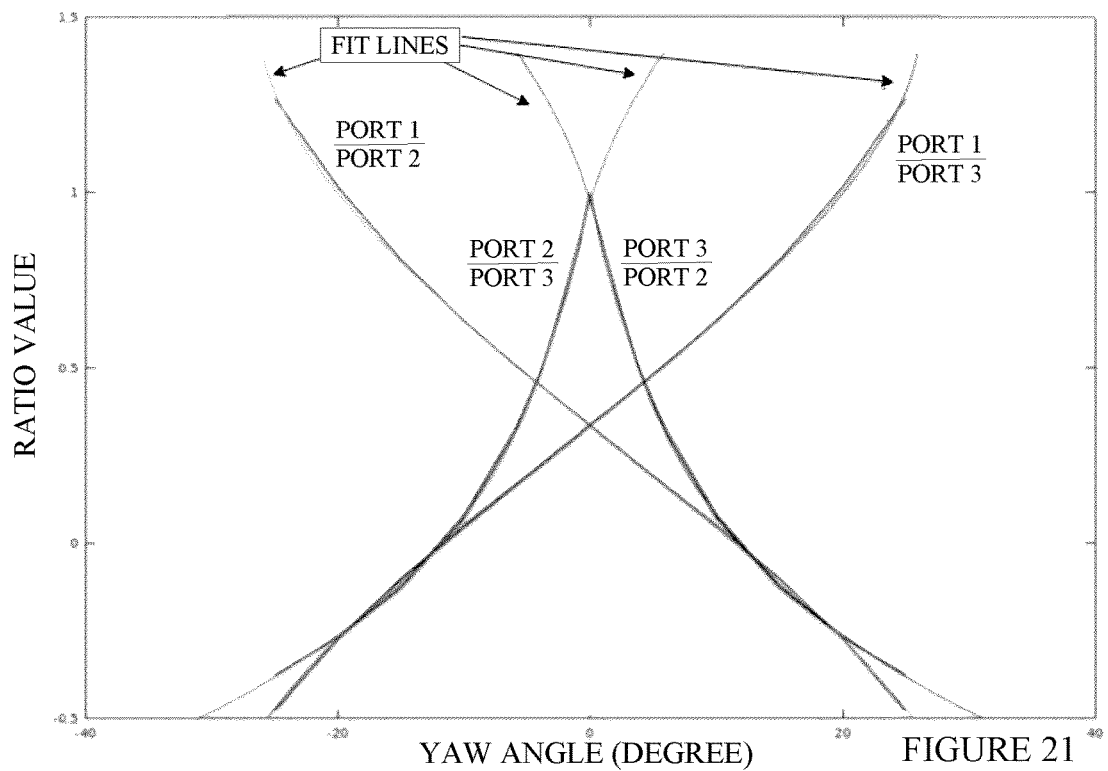
FIG. 21 is a plot of illustrative frontal pressure ratios computed between ports of a multiport airspeed sensor as a function of sensor yaw angle, in accordance with and embodiment having three inlet ports.
Figure 22:
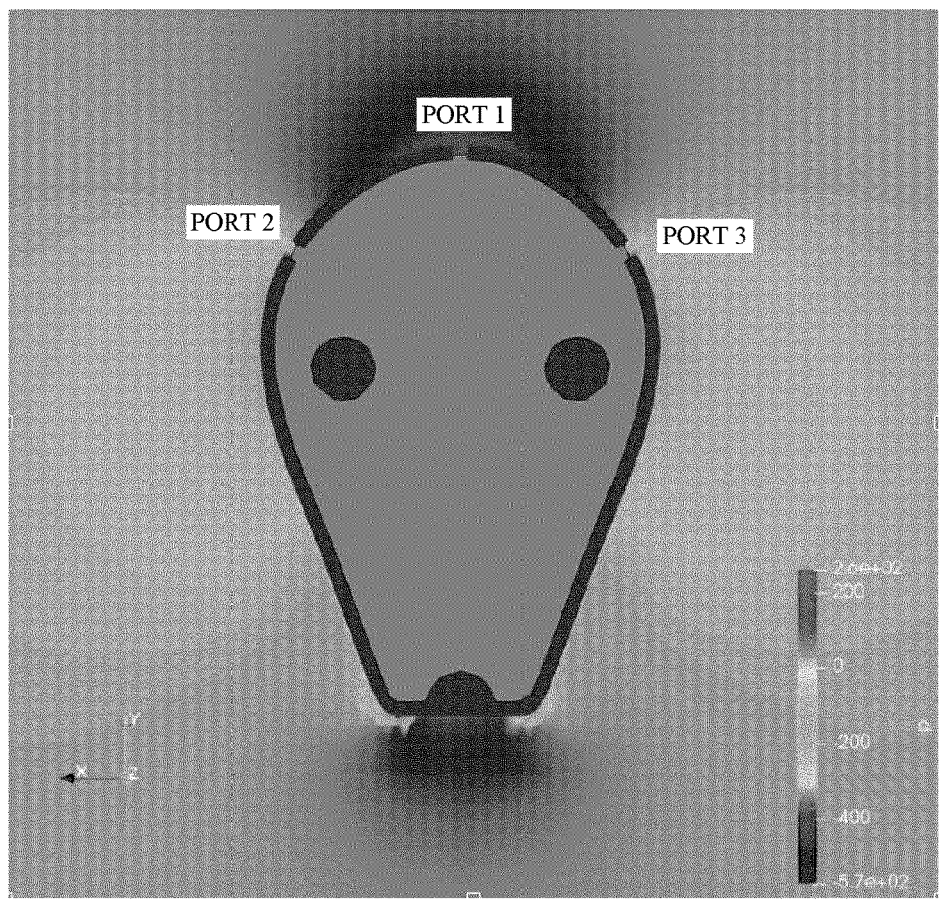
FIG. 22 is a mapping of port locations and surrounding pressure values for the multiport airspeed sensor design contemplated for the frontal pressure ratios computed in FIG. 21.

The following provides exemplary computations and data for a multiport airspeed sensor as described above. For instance, FIG. 21 provides a plot of illustrative frontal pressure ratios computed between ports of the multiport airspeed sensor as a function of sensor yaw angle, in accordance with one embodiment, whereas FIG. 22 provides a mapping of port locations and surrounding pressure values for the multiport airspeed sensor design contemplated for the frontal pressure ratios computed in FIG. 21. In this particular example, relative airspeed ranges of 18-55 km/h have been plotted, all resulting in substantially the same pressure ratios. It will be appreciated that while the following focuses on the implementation of a three-port sensor, other mutliport configurations may be considered, as detailed above. Furthermore, while a substantially lateral alignment of the exemplary ports is contemplated so to compute a relative yaw angle of incident airspeed, other port orientations may be considered, for example, to contemplate a relative pitch or roll angle, as the case may be, or a combination thereof.

As shown in FIG. 21, it is observed that there is a unique combination of pressures at discrete locations on a body of the multiport sensor for every yaw angle and wind speed. Namely, in accordance with some embodiments, a relative incident airspeed Yaw angle on the sensor body can be computed by computationally comparing measured port ratios with designated port ratio functions relating the ratio of port pressures to Yaw angle. For example, in the illustrated embodiment, each noted relative port pressure ratio can be expressed as a predictable 5th order polynomial function. As illustrated, these ratios are independent of wind speed, despite the actual magnitude of surface pressure changing. In the three-port embodiment illustrated herein, the ratios used are as follows:

$$\frac{Port1}{Port2}, \frac{Port1}{Port3}, \frac{Port3}{Port2}, \frac{Port2}{Port3}$$

While the use of both port2/port3 and port3/port2 ratios may be somewhat redundant in some instances (being reciprocals of one another other), in some embodiments, these can both nonetheless be used as each of these ports may go to zero differential pressure at different Yaw angles (e.g. for strong side winds). Accordingly, attempting to compute pressure ratios for points where the dominator pressure tends to zero can become problematic, making such ratios unusable for accurate Yaw angle determination.

In some embodiments, respective port pressures will be computed as a function of a common reference pressure, for example, an internal (casing) reference pressure, using respective differential pressure sensors. To do so, using multiple pressure ratios can provide the iterative determination of the internal pressure, which will typically be offset from zero gauge pressure. For instance, this offset amount is typically unknown. Using multiple pressure ratios, however, an internal case pressure can be solved for iteratively so that, when added to the measured pressure ratios, each ratio will return a same yaw angle determination. Effectively this means that the internal case pressure is not required to be constant, or even characterised, so long as the incident pressure ratios have been characterised prior to collecting real world data. Accordingly, the use of a static port becomes unnecessary.

Figure 23:
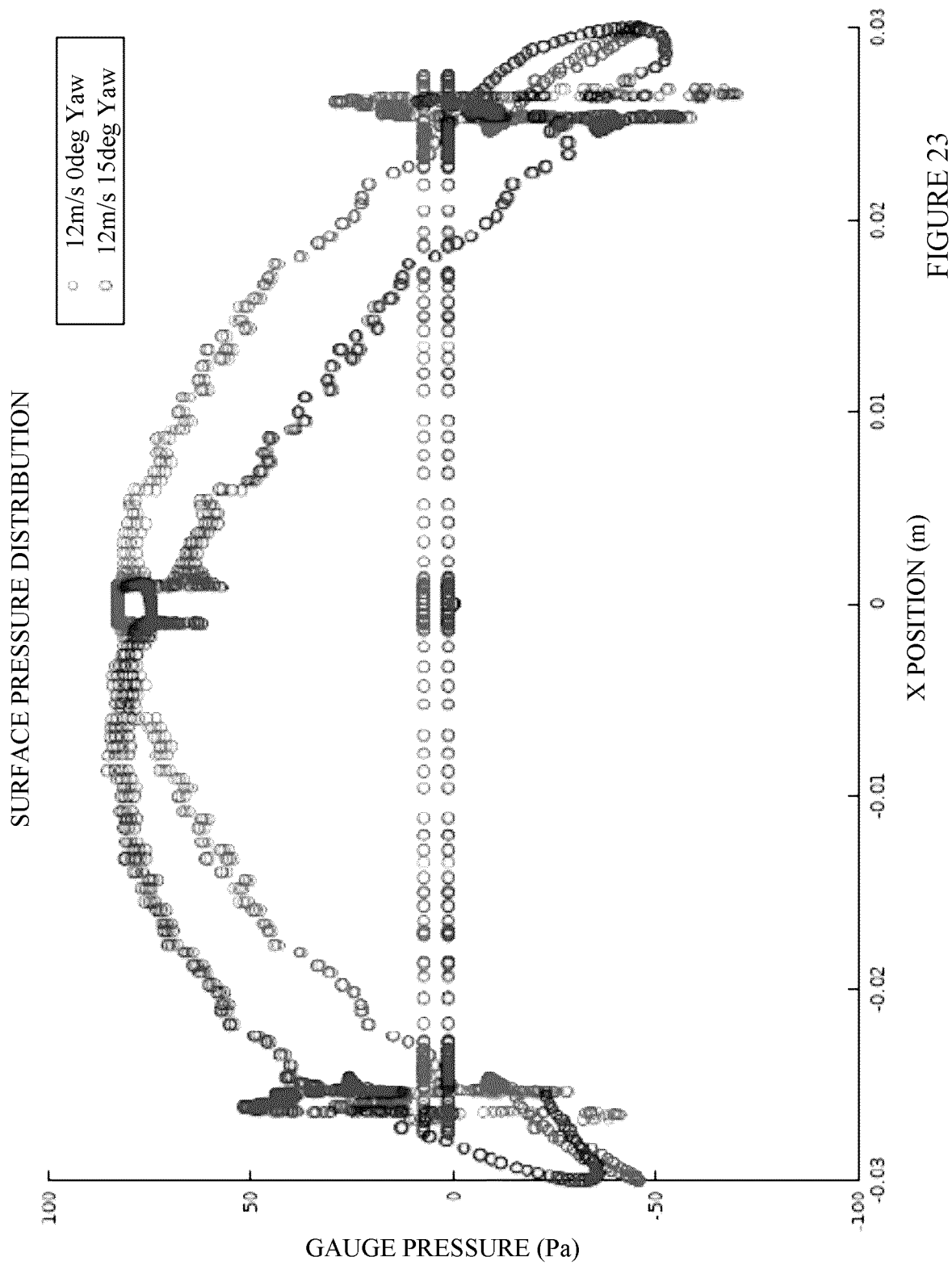
FIG. 23 is a plot of illustrative surface pressure distributions at different yaw angles as compared to an internal sensor offset pressure for a multiport airspeed sensor, in accordance with one embodiment.

FIG. 23 provides a plot of illustrative surface pressure distributions at different yaw angles as compared to an internal sensor offset pressure for a multiport airspeed sensor, in accordance with one embodiment, wherein the line across the center is the internal case offset pressure in these data series. As can be appreciated from this data, implementation of a two-port embodiment, while operable in some conditions, could exhibit limited performance in certain circumstances where surface pressures cross for different yaw angles, making it difficult if not impossible to resolve accurate yaw angles around these points if relying solely on pressure ratios from two ports, i.e. there would not be an offset pressure that could be applied to change the relative value of the two ratios.

Following from the above examples, once a yaw angle is determined, an incident airspeed at each port may also be calculated as a function of a port pressure and yaw angle. Again, the process of identifying wind speeds relies on characterisation of the port pressures under different incident airspeeds and yaw angles. The airspeed correlation to pressure at one of the ports (the front port in this example) is dependant on Yaw angle. Since Yaw angle can be calculated using the ratios above to a high degree of accuracy, using a factor of yaw in wind speed inference makes the resulting wind speed also accurate. The basic formula for wind speed is a stagnation pressure formula, with coefficients that are a third order function with Yaw as an input.

$$V = \sqrt{\frac{f(\theta)\Delta P_1}{\rho}} + g(\theta)$$

Where P1 is, in this instance, the center port pressure; $f(\theta)$ and $g(\theta)$ are polynomial functions of yaw angle $\theta$; and $\rho$ is the density of the air interacting with the front of the body. As noted above, the differential surface pressure can be determined with high precision by iteratively computing the internal case offset pressure in the first step of determining Yaw angles. Note that, in some embodiments, a tempetrature dependancy may also be accounted for, for exmaple, when processing a value for the air density.

Figure 24:
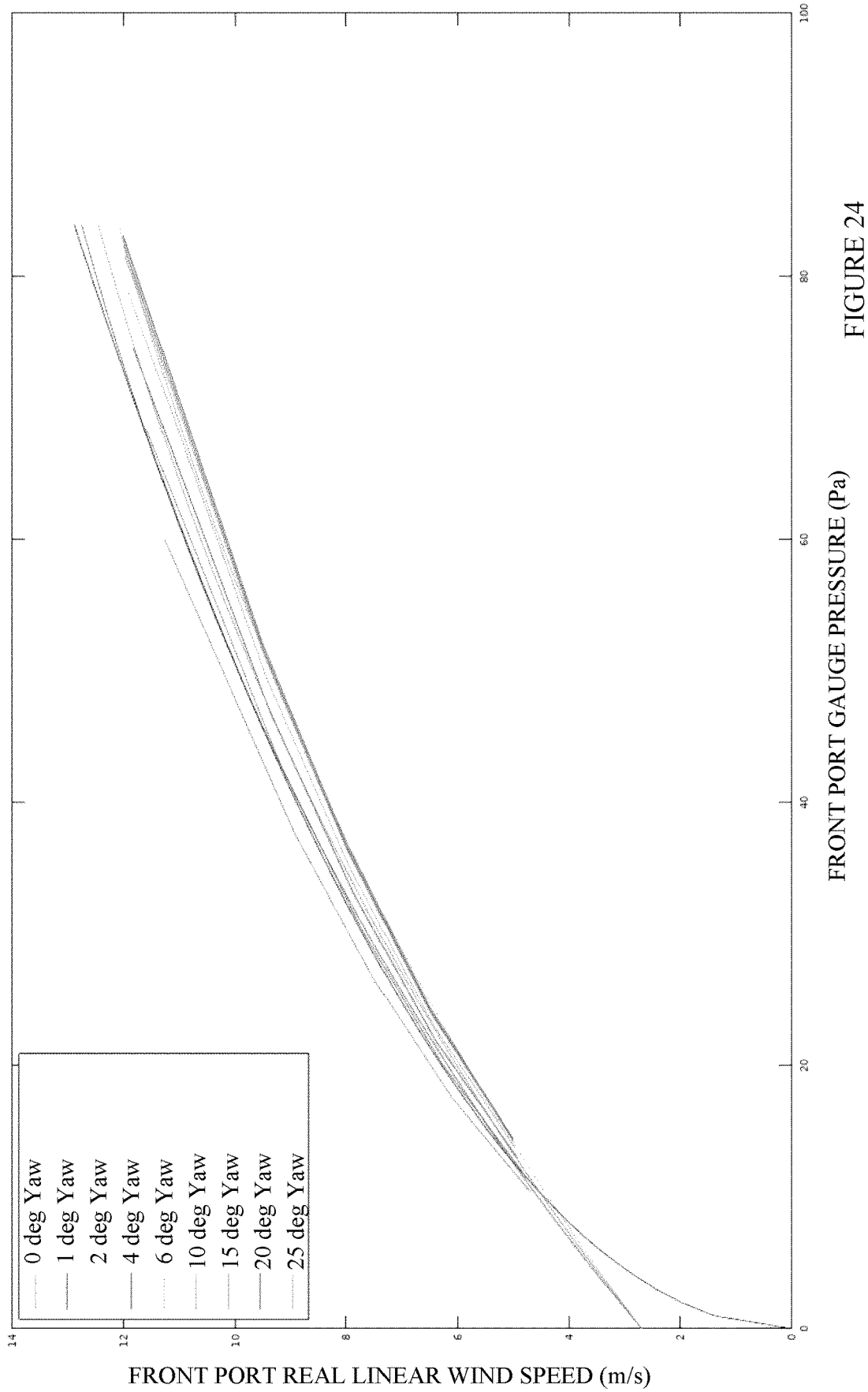
FIG. 24 is a plot of illustrative frontal port pressures at various wind speeds and yaw angles for a multiport airspeed sensor, in accordance with one embodiment.

FIG. 24 provides an illustrative plot of a frontal port pressure at various wind speeds and yaw angles. The fit line that goes to the origin is the characterised fit line for $\theta=20$ degrees of Yaw.

As noted above, while most examples provided herein illustrate implementation of a three-port airspeed sensor, other configuraitons may also be considered, such as a four-port sensor or even a higher number of ports, for example, to correspondingly increase accuracy, redunancy and/or statistical measures to refine output characterizations. In accordance with one such embodiment, a multiport airspeed sensor, as illustrated for example in FIG. 27, and generally referred to herein using the numeral 1200, comprises a sensor body 1202 and a series of airspeed sensor inlet ports 1204 distributed symmetrically along a surface thereof to each discretely interface with an interfacing air speed at distinct relative interfacing angles. In this particular case, the inlet ports consist of two (2) pairs of opposed side-angled ports 1208, 1210 and 1209, 1211, respectively, thus providing for discrete air speed capture around an axis defined thereby that is, as described above, useable in automatically and accurately determining an air speed and direction around this axis. Namely, where the sensor 1200 is disposed so to orient the airspeed ports 1204 on a lateral plane (1213) to define a substantially vertical axis, an interfacing air speed and Yaw angle may be accurately determined. Naturally, reorientation of the sensor may provide alternative directional airspeed information, as can the use of a distinctly oriented set of sensor ports be used to provide complementary directional information (e.g. complementary Yaw and Pitch angles).

Figure 27:
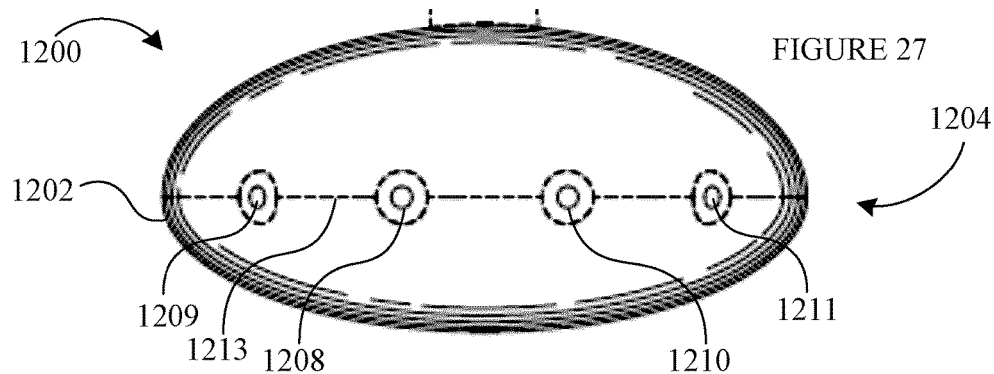
FIG. 27 is a front elevation view of a multiport airspeed sensor having four inlet ports, in accordance with one embodiment.
Figure 28:
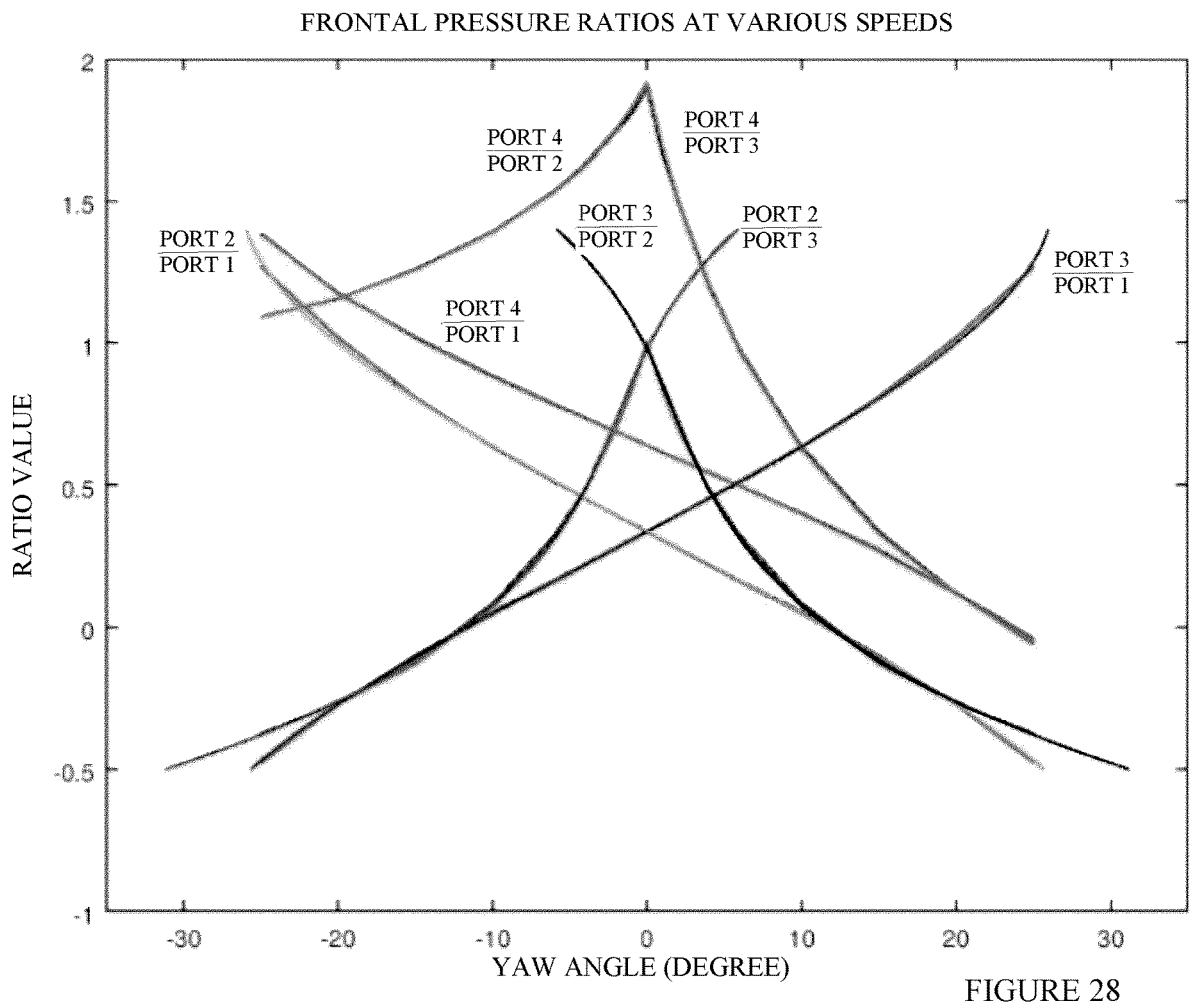
FIG. 28 is a plot of illustrative frontal pressure ratios computed between ports of a multiport airspeed sensor as a function of sensor yaw angle, in accordance with an embodiment having four inlet ports.

Furthermore, while a symmetric distribution of inlet ports is illustrated in FIG. 27, other symmetric or asymmetric distributions may also be considered, for example, where a four angulalry offset port is included on either side of the three-port configuraiton shown in FIGS. 1 and 2. For instance, the plot shown in FIG. 28 for an asymmetric four-port embodiment illustrates seven (7) selected port ratios, as in FIG. 21. Effectively, for any given inlet port angle, there are now 3 to 4 viable ratio measurements to compare. This approach can thus be used to statistically improve results that otherwise could more easily be influenced by sensor errors and/or limitations.

Accordingly, the ports can be arranged symmetrically about the center, with no port at the tip of the device, or again include a central port in other configurations. A fifth port can also be added provide symmetry about a central port. For example, illustrative port ratios for a five-port embodiment are illustrated in FIG. 29, showing up to eight (8) usable port ratios to measure Yaw in this case.

Figure 29:
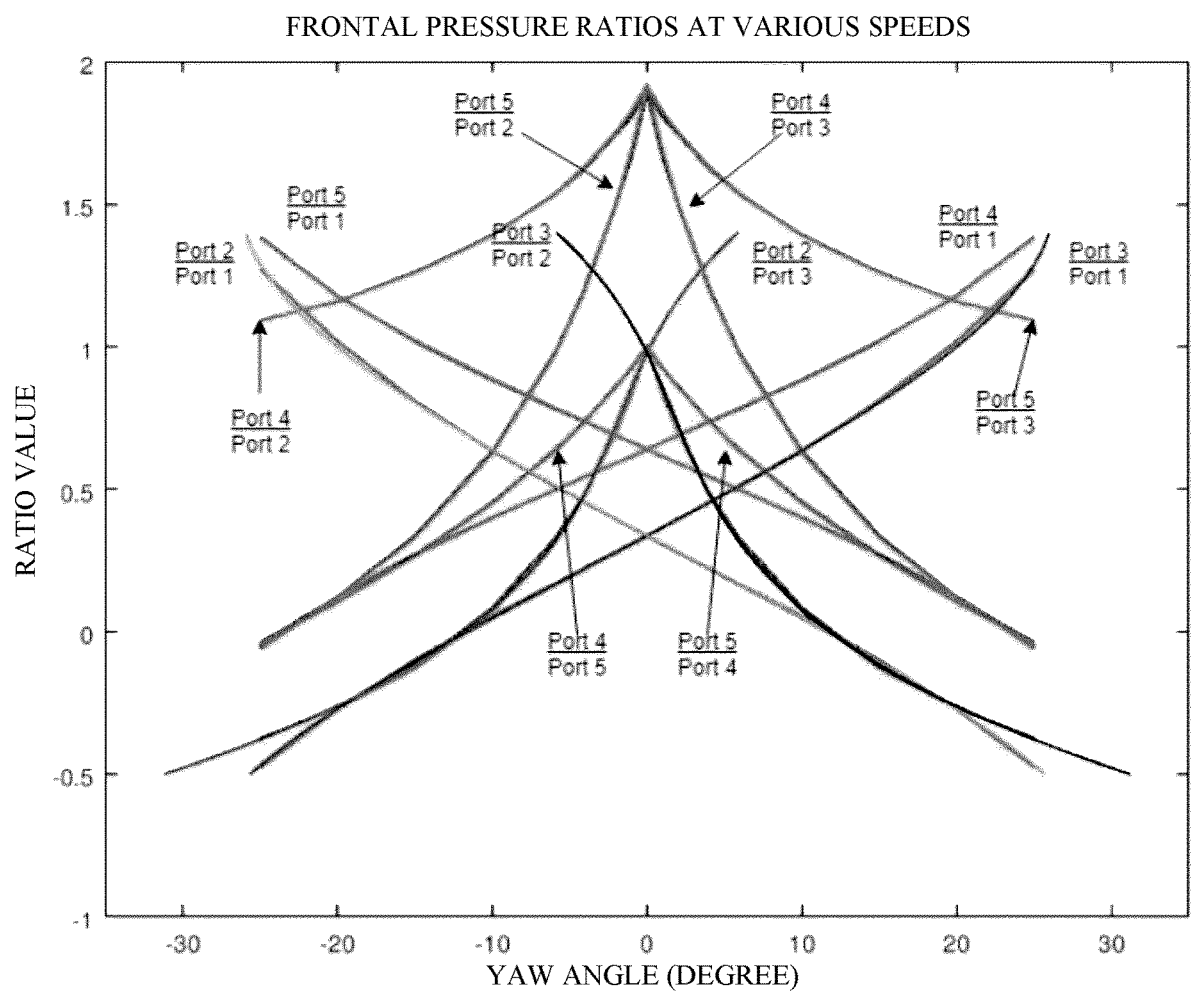
FIG. 29 is a plot of illustrative frontal pressure ratios computed between ports of a multiport airspeed sensor as a function of sensor yaw angle, in accordance with an embodiment having five inlet ports.

While the plot in FIG. 29 starts to look busy, computationally, this scenario may become more accurate by decreasing the range of a corresponding confidence interval (CI). Because there are always more pressure ratios that could theoretically be measured, the ratios that are used represent a small set of a larger range of ratios. Using statistical inference on the data set measured can thus give information regarding the accuracy of the values being measured.

To support the position that additional ratio measurements can increase output accuracy by decreasing the CI, various assumptions can be made, such as:

the error in measurements are due to random sensor errors; random sensor errors act as observational errors; the number of ratios used is a sample of a theoretically infinite set of ratios representative of yaw angle; the error is assumed to be normally distributed about a true yaw value.

Generally, the measurement of yaw will have a confidence interval (CI) and confidence level associated with it—this is the level of confidence that the measured parameter lies within the confidence interval. The confidence interval will change depending on the quantity and distribution of yaw angles. yaw angles.

Finding the confidence interval, in this example, requires an estimate of the true expected value. This is typically the average of a set of samples:

$$\hat{\mu} \: X \: \frac{1}{n}\sum_{i=1}^{n} \: X_i$$

where $\hat{u}$ is the average value of the port ratios at the time of measurement.

A variable Z is calculated based on the desired confidence interval (in this example 95%) using the assumption that the data is normally distributed about the true mean. For a 95% confidence interval Z=1.96 and we obtain:

$$-P\left(\overline{X} - 1.96\frac{\sigma}{\sqrt{n}} < \mu < \overline{X} + 1.96\frac{\sigma}{\sqrt{n}}\right)$$

where sigma is the standard deviation of yaw obtained through pressure ratios, and n is the number of pressure ratios used. The variable "u" is the true yaw, which remains unknown.

It can be seen that the angular CI for a percentage CI becomes smaller for an increasing number of yaw ratio measurements, so long as the standard deviation does not increase unreasonably. In other words, with an increase in the number of port ratios used, the CI will be a narrower band around the actual desired yaw angle.

The standard deviation is:

$$s - \sqrt{\frac{\sum_{i=1}^{N}(x_i \: x)^2}{N \: 1}}$$

How the yaw angle confidence interval changes with the number of yaw readings (sample ratios) can be seen below:

$$\overline{X} + Z*\frac{\sigma}{\sqrt{n}}$$

$$\overline{X} + Z * \frac{\sqrt{\frac{\Sigma(x_i - \overline{x})^2}{n-1}}}{\sqrt{n}}$$

$$\overline{X} + Z * \sqrt{\Sigma(x_i - \overline{x})^2} * \frac{1}{n * \sqrt{1 - \frac{1}{n}}}$$

If Z is constant, and $$\sqrt{\Sigma(x_i - \overline{x})^2}$$

does not grow significantly:

$$\overline{X} \pm B$$

where B is proportional to 1/sqrt(n).

Figure 30:
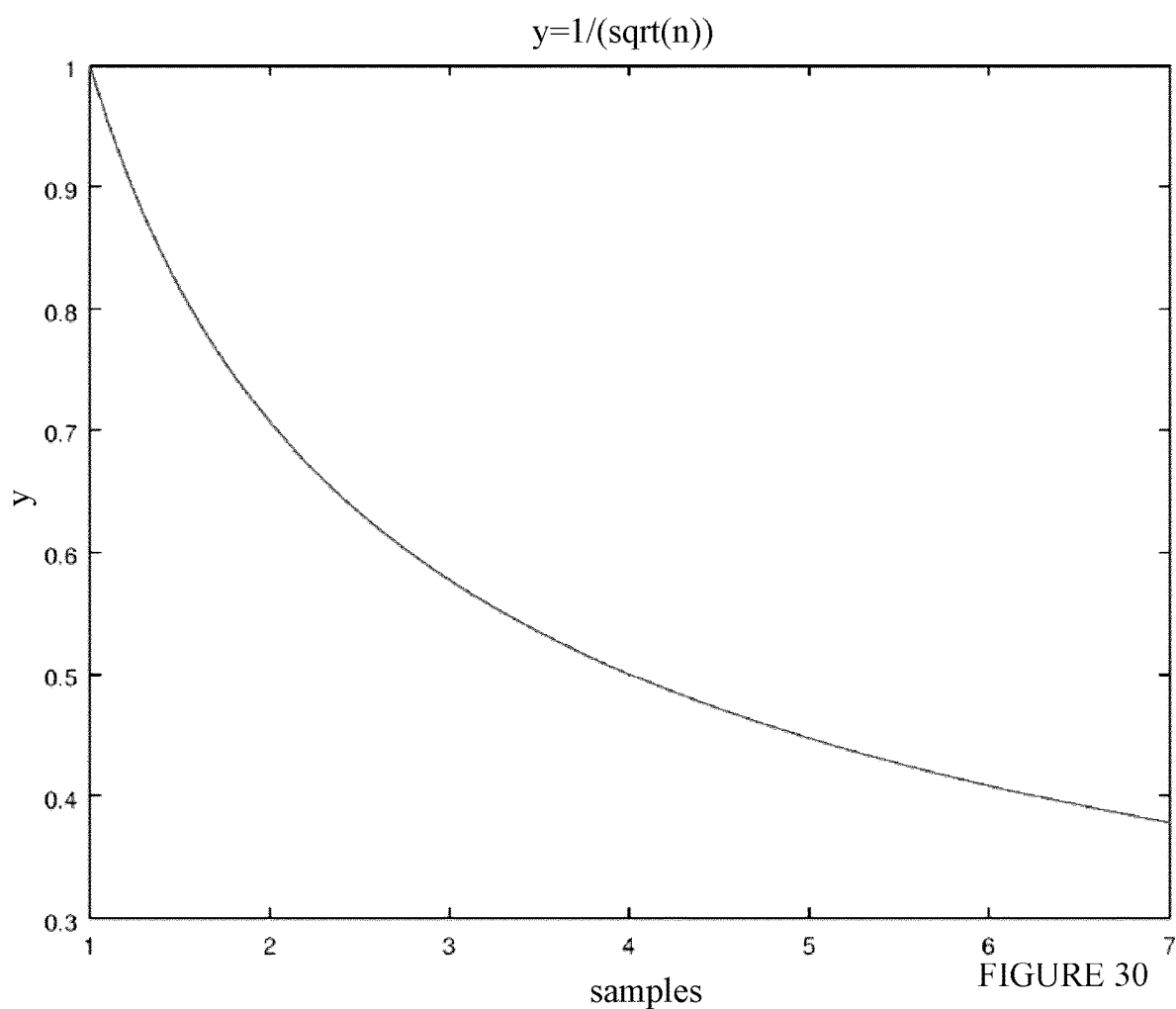
FIG. 30 is an illustrative plot of how a statistical confidence interval for airspeed sensor inlet port data ratios will decrease with increased sampling, in accordance with one embodiment.

Therefore the yaw angle confidence interval trend can be seen in the plot shown at FIG. 30. As can be seen from this plot, the yaw CI decreases quickly with an increase in samples.

As will be appreciated by the skilled artisan, different statistical models and techniques may be implemented to address variable measurements and errors that may surface for different sensor/system implementation and/or to increase a level of output accuracy and/or confidence depending on an application at hand, for example These and other such statistical approaches, or again other computational techniques for consolidating, combining or otherwise accounting for distinct sensor ratios may be considered herein without departing from the general scope and nature of the present disclosure.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. An airspeed sensor comprising:
   a sensor casing having a leading surface and having plural distinctly oriented input ports defined therein to capture a respective air pressure at each one thereof;
   respective pressure sensors disposed within said casing in fluid communication with respective ones of said input ports to sense said respective air pressure for each one thereof;
   a digital processor operatively coupled to each of said pressure sensors to digitally compute respective pressure ratios between said input ports and compare said ratios against designated pressure ratios corresponding to designated incident airspeed angles of incidence to output an airspeed incident angle and airspeed accordingly.

2. The airspeed sensor of claim 1, wherein said pressure sensor comprises differential pressure sensors operable to sense respective relative air pressures for each of said input ports with reference to a common reference pressure.

3. The airspeed sensor of claim 2, wherein the sensor further comprises a static pressure port from which to measure said common reference pressure.

4. The airspeed sensor of claim 2, wherein said common reference pressure comprises an internal casing pressure.

5. The airspeed sensor of claim 4, wherein said internal casing pressure is iteratively computed by said digital processor to coincide with computation of a identical airspeed incident angle from each of said ratios.

6. The airspeed sensor of claim 5, wherein said plural distinctly oriented input ports comprise at least three distinctly oriented input ports.

7. The airspeed sensor of claim 6, wherein said at least three input ports are linearly distributed along said leading surface to form respective angles of incidence around a common axis such that said airspeed incident angle is computed around said axis.

8. The airspeed sensor of claim 7, wherein the airspeed sensor is disposable so to align said leading surface with a direction of travel such that said input ports and said axis are perpendicular to said direction of travel.

9. The airspeed sensor of any one of claim 5, wherein said input ports comprise a central input port and two opposed side-angled input ports.

10. The airspeed sensor of claim 1, further comprising a communication interface to externally communicate said airspeed incident angle and said airspeed to an external device.

11. An airspeed sensing system comprising:
    an airspeed sensor comprising plural distinctly oriented input ports to capture a respective air pressure at each one thereof;
    respective pressure sensors in fluid communication with respective ones of said input ports to sense said respective air pressure for each one thereof;
    a digital processor operatively coupled to each of said pressure sensors to digitally compute respective pressure ratios between said input ports and compare said ratios against designated pressure ratios corresponding to designated incident airspeed angles of incidence to output an airspeed incident angle and airspeed accordingly.

12. The system of claim 11, wherein said input ports are defined within a continuous leading surface of said airspeed sensor, and wherein said input ports are linearly distributed along said leading surface to form respective angles of incidence around a common axis such that said airspeed incident angle is computed around said axis.

13. The system of claim 11, wherein said input ports are defined into respective sensor modules disposed or disposable so to linearly distribute said sensor modules to form respective angles of incidence around a common axis such that said airspeed incident angle is computed around said axis.

14. The system of claim 11, wherein said airspeed sensor comprises a casing and wherein said respective pressure sensors are disposed within said casing.

15. The system of claim 14, wherein said digital processor is disposed in and operated from within said casing.

16. The system of claim 15, further comprising a communication interface to externally communicate said airspeed incident angle and said airspeed to an external device.

17. The system of claim 11, wherein said airspeed sensor is integrated forward-facing within one of a bicycle helmet, a bicycle handle bar or a bicycle component.

18. The system of claim 11, wherein said airspeed sensor is integrated within a wearable component, the system further comprising a relative orientation sensor for monitoring an orientation of said wearable component relative to a direction of travel such that said airspeed incident angle is output relative to said direction of travel.

19. A helmet comprising:
an integrated airspeed sensor comprising plural distinctly oriented input ports to capture a respective air pressure at each one thereof, and respective pressure sensors in fluid communication with respective ones of said input ports to sense said respective air pressure for each one thereof, wherein each of said pressure sensors are configured for operative coupling to a digital processor to digitally compute respective pressure ratios between said input ports and compare said ratios against designated pressure ratios corresponding to designated incident airspeed angles of incidence to output an airspeed incident angle and airspeed accordingly.

20. The helmet of claim 19, wherein the helmet further comprises a relative orientation sensor for monitoring an orientation of the helmet relative to a direction of travel such that said airspeed incident angle is output relative to said direction of travel.

21. An athletic component comprising:
an integrated airspeed sensor comprising plural distinctly oriented input ports to capture a respective air pressure at each one thereof, and respective pressure sensors in fluid communication with respective ones of said input ports to sense said respective air pressure for each one thereof, wherein each of said pressure sensors are configured for operative coupling to a digital processor to digitally compute respective pressure ratios between said input ports and compare said ratios against designated pressure ratios corresponding to designated incident airspeed angles of incidence to output an airspeed incident angle and airspeed accordingly.

22. The athletic component of claim 21, wherein said digital processor is integrated with said airspeed sensor.

23. The athletic component of claim 21, wherein the component is selected from the group consisting of: bicycle handlebars, a bicycle stem, instrumented bicycle brifters, a helmet, a wearable component, body armour, skis, ski boots, or goggles.

* * * * *